United States Patent
Thomas et al.

(10) Patent No.: US 9,160,232 B2
(45) Date of Patent: Oct. 13, 2015

(54) EFFICIENT REGULATION OF CAPACITANCE VOLTAGE(S) IN A SWITCHED MODE MULTILEVEL POWER CONVERTER

(71) Applicant: ST-Ericsson SA, Plan-les-Ouates (CH)

(72) Inventors: Matthieu Thomas, Praha 8 (CZ); Patrik Arno, Sassenage (FR); Vladimir Molata, Moravska Nova Ves (CZ); Ondrej Tlaskal, Kamenice (CZ)

(73) Assignee: ST-ERICSSON SA, Plan-Les-Quates (CH)

( * ) Notice: Subject to any disclaimer, the term of this patent is extended or adjusted under 35 U.S.C. 154(b) by 251 days.

(21) Appl. No.: 13/963,087

(22) Filed: Aug. 9, 2013

(65) Prior Publication Data

US 2014/0232364 A1 Aug. 21, 2014

Related U.S. Application Data

(60) Provisional application No. 61/779,233, filed on Mar. 13, 2013.

(30) Foreign Application Priority Data

Feb. 15, 2013 (EP) ..................................... 13305179

(51) Int. Cl.
*H02M 3/158* (2006.01)
*H02M 7/483* (2007.01)
*H02M 1/00* (2007.01)

(52) U.S. Cl.
CPC ............ *H02M 3/1588* (2013.01); *H02M 7/483* (2013.01); *H02M 2001/0003* (2013.01); *H02M 2001/0009* (2013.01); *Y02B 70/1466* (2013.01)

(58) Field of Classification Search
CPC ............................ H02M 3/1588; H02M 7/483
USPC .......... 363/17, 20, 21.01, 37, 71, 95, 98, 131, 363/132, 133, 134; 323/225, 268, 271, 350
See application file for complete search history.

(56) References Cited

U.S. PATENT DOCUMENTS 7,612,603 B1 * 11/2009 Petricek et al. ............... 327/530
7,688,048 B2 * 3/2010 Nielsen ......................... 323/268

(Continued)

FOREIGN PATENT DOCUMENTS

| CN | 102332818 A | 1/2012 |
|---|---|---|
| WO | 0019597 A1 | 4/2000 |
| WO | 2012074967 A1 | 6/2012 |

OTHER PUBLICATIONS

Chunrnei Feng et al., "A Novel Voltage Balancing Control Method for Flying Capacitor Multilevel Convertors", The 29th Annual Conference of the IEEE Industrial Electronics Society, 2003, IECON 2003, IEEE Service Center, Piscataway, NJ, vol. 2, Nov. 2, 2003, pp. 1179-1184.

(Continued)

*Primary Examiner* — Gary L Laxton
*Assistant Examiner* — Kyle J Moody
(74) *Attorney, Agent, or Firm* — Coats & Bennett, PLLC

(57) ABSTRACT

A power conversion circuit uses smaller, cheaper, and faster analog and digital circuits, e.g., buffers, comparators, and processing circuits, to provide the information necessary to control a multilevel power converter faster, cheaper, and with a smaller footprint than conventional techniques. For example, a current detection circuit indirectly measures a direction of a current through an inductor connected between midpoint node and an output node of a multilevel power converter based on comparisons between voltages associated with the multilevel power converter. A capacitor voltage detection circuit detects a capacitor voltage across the flying capacitor to generate a logic signal based on a comparison between the capacitor voltage and a first reference voltage. A control circuit selects an operating state of the multilevel power converter to regulate a first capacitor voltage across the first capacitor based on the indirectly measured direction of the inductor current, the logic signal, and an input command signal.

18 Claims, 17 Drawing Sheets

(56) References Cited

U.S. PATENT DOCUMENTS

| | | | | |
|---|---|---|---|---|
| 9,048,730 | B2* | 6/2015 | Broussev et al. | 323/271 |
| 2008/0157723 | A1* | 7/2008 | Xing et al. | 320/164 |
| 2008/0239772 | A1* | 10/2008 | Oraw et al. | 363/60 |
| 2011/0018511 | A1 | 1/2011 | Carpenter et al. | |

OTHER PUBLICATIONS

Song, B-M, et al. "A Soft-Switching High-Voltage Active Power Filter with Flying Capacitors for Urban Maglev System Applications", Conference Record of the 2001 IEEE Industry Applications Conference, Thirty-Sixth IAS Annual Meeting, Sep. 30, 2001, pp. 1461-1468, vol. 3, IEEE, Chicago, US.

Shukla, A., et al., "Capacitor Voltage Balancing Schemes in Flying Capacitor Multilevel Inverters", Power Electronics Specialists Conference, Jun. 17, 2007, pp. 2367-2372, IEEE, Orlando, US.

Khazraei, M., et al., "Active Capacitor Voltage Balancing in Single-Phase Flying-Capacitor Multilevel Power Converters", IEEE Transactions on Industrial Electronics, Feb. 1, 2012, pp. 769-778, Volume: 59, Issue: 2, IEEE Industrial Electronics Society.

Meynard, T., et al., "Multi-level Conversion: High Voltage Choppers and Voltage-Source Inverters", 23rd Annual IEEE Power Electronics Specialists Conference, Jun. 29, 1992, pp. 397-403, IEEE, Toledo, ES.

Yuan, X., et al., Self-Balancing of the Clamping-Capacitor-Voltages in the Multilevel Capacitor-Clamping-Inverter under Sub-Harmonic Pwm Modulation, IEEE Transactions on Power Electronics, Mar. 1, 2011, pp. 256-263, vol. 16, Issue 2, IEEE Power Electronics Society.

Yousefzadeh, V., et al., "Optimization and implementation of a multi-level buck converter for standard CMOS on-chip integration", International Workshop on Power Supply on Chip, Sep. 22, 2008, pp. 1-34, [Retrieved on Jul. 12, 2013], retrieved from internet: http://www.readbag.com/powersoc-pwrsoc08-presentations-received-invited-talk-s5x4-eduardalarcon-optimization-and-implementation-of-a-multi-level-buck-converter-for-standard-cmos-on-chip-integration.

Huang, J., et al., "Extended Operation of Flying Capacitor Multilevel Inverters", IEEE Transaction on Power Electronics, Jan. 1, 2006, pp. 140-147, vol. 21, No. 1, IEEE.

\* cited by examiner

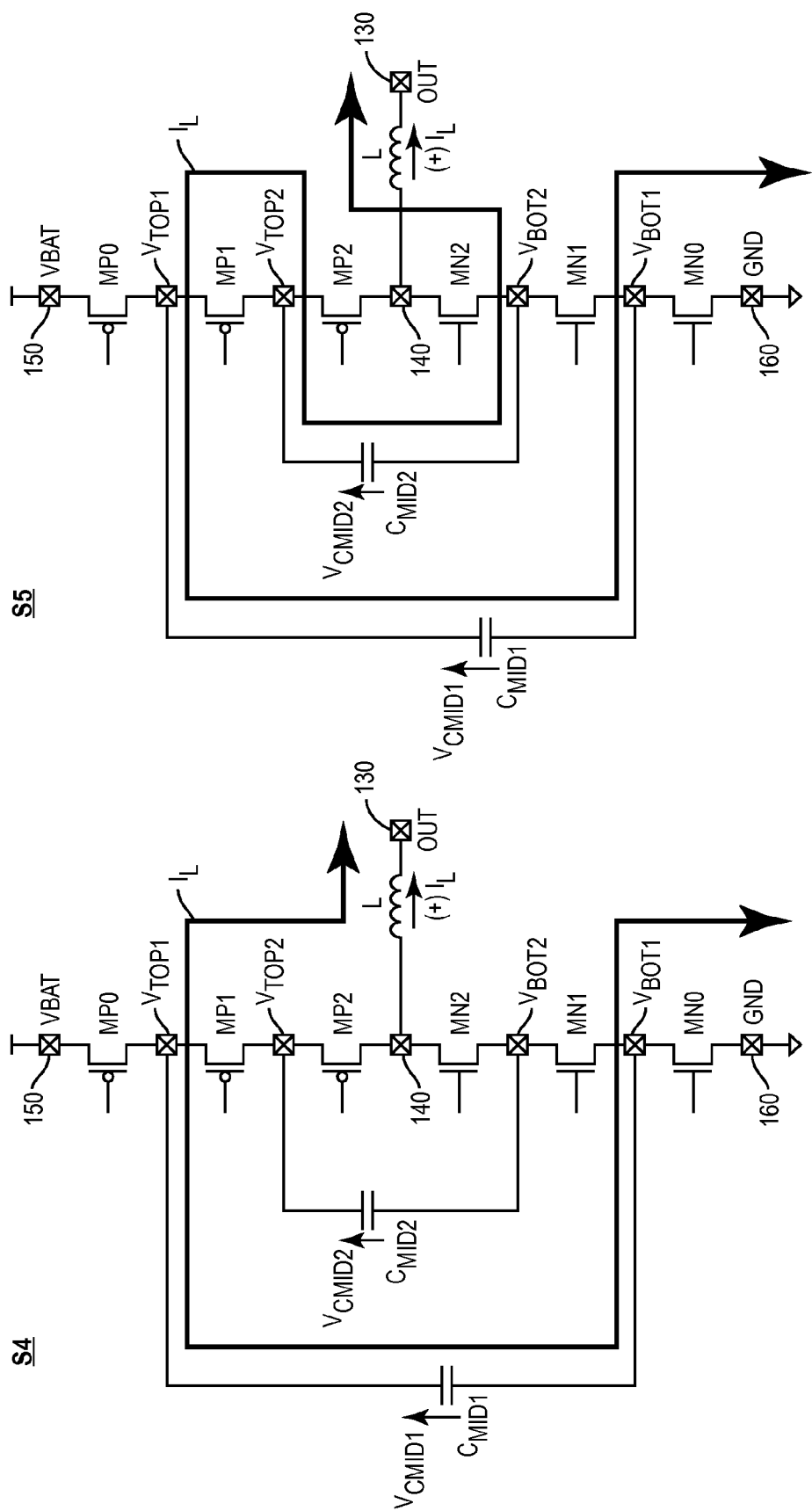

EFFICIENT REGULATION OF CAPACITANCE VOLTAGE(S) IN A SWITCHED MODE MULTILEVEL POWER CONVERTER

This application claims priority to EP13305179.7 filed 15 Feb. 2013 and Provisional U.S. Patent Application 61/779,233 filed 13 Mar. 2013, which are both incorporated herein by reference.

BACKGROUND

The invention disclosed herein generally relates to voltage regulation, and more particularly relates to switched mode power converter, e.g., as implemented by an N-level Buck architecture.

Multilevel converter structures are known in power converter applications. For example, flying-capacitor converter topology, hereafter noted FCC, was introduced in 1992 for inverter applications. See, e.g., T. A Meynard, H. F. (1992) "Multilevel Conversion: High Voltage Choppers and Voltage-Source Inverters," *Power Electronics Specialists Conference* (pp. 397-403); Toledo: IEEE. FCC topology provides a lower output voltage ripple, reduced harmonic distortion, and lower electromagnetic concerns. See, e.g., A. Shukla, A. G. (June 2007); "Capacitor Voltage Balancing Schemes in Flying Capacitor Multilevel Inverters," *Proc. IEEE Power Electron.*, vol. 6, no. 1, pp. 2367-2372.

An exemplary FCC power converter, e.g., shown in FIG. 1, includes four power switches (two high side switches and two low side switches, all of which are serially connected between VBAT and ground), an inductor L, and a Flying capacitor $C_{MID}$. The inductor is connected between an output node and a midpoint node located between the high and low side switches. The capacitor is connected in parallel with two of the power switches. The FCC power converter can be configured in four operational configurations or states, e.g., those shown in Table 1 below, when the voltage across the flying capacitor $V_{CMID}$ equals ½VBAT. Both states S1 and S2 generate the level ½VBAT on the LX node located at the midpoint between the power switches, e.g., between the two high side switches and the two low side switches. States S1 and S2 are hereafter called redundant states, and thus this FCC converter is commonly referred to as a 3-level FCC converter.

TABLE 1

| | Multilevel power converter Configurations | | | | |
|---|---|---|---|---|---|
| STATE | M0 | M1 | M2 | M3 | V(LX) |
| S0 | ON | ON | OFF | OFF | VBAT |
| S1 | OFF | ON | OFF | ON | ½ VBAT |
| S2 | ON | OFF | ON | OFF | ½ VBAT |
| S3 | OFF | OFF | ON | ON | 0 |

The functionality of the FCC converter relies on correct balancing of the flying capacitor. For a 3-level FCC converter, the flying capacitance is maintained at a voltage of ½VBAT. Several techniques exist to address this requirement.

"Self-Balancing of the Clamping-Capacitor-Voltages in the Multilevel Capacitor-Clamping-Inverter under Sub-Harmonic PWM Modulation" by X. Yuan, H. S. (March 2001, *IEEE Trans. Power Electron.*, vol. 16, no. 2, pp. 256-263) explores "natural-balancing" techniques for FCC. Active regulation techniques, such as modifying the duty-cycle or redundant state selection (RSS), have also been described in literature. For example, "A Soft-Switching High-Voltage Active Power Filter with Flying Capacitors for Urban Maglev System Applications by B. M. Song, J. S. (2001, *Conf. Rec. IEEE IAS Annu. Meeting*, vol. 3, pp. 1461-1468) maintains the flying capacitor voltage by adjusting the duty cycle according to the error between the measured voltage and a reference. "Active Capacitor Voltage Balancing in Single-Phase Flying Capacitor Multilevel Power Converters" by M. Khazraei, H. S. (February 2012, *IEEE Trans. Ind. Electron.*, vol. 59) presents a regulation technique for an N-level FCC using RSS. In this regulation scheme, the presence of redundant states for generating some voltage levels (VBAT/2 in the 3-level case) is leveraged for the regulation of the flying capacitor. When several states are available to generate a given output level, some of the states will charge the flying capacitance while other states will discharge the flying capacitor. The charging/discharging property of a given state is dependent on the current polarity in the inductor. Thus, based on the voltage level of the flying capacitor, the direction of the current in the coil, and the voltage level to be generated at the output, it is possible to select the best operational state for maintaining the desired flying capacitor voltage level.

Conventional power converters were mainly developed for power inverters, and thus for applications running with discrete switching elements operating under hundreds of volts and at switching frequencies of 1-10 kHz. Further, conventional power converter solutions use discrete Hall Effect sensors, which tend to be large and require a large footprint on a circuit board, to implement the requisite current sensing in the coil. When using power converters in mobile communication devices, however, the control system requires higher speeds (e.g., switching frequencies in the range of 50-200 MHz), lower cost, and smaller footprints.

SUMMARY

The power conversion disclosed herein uses smaller, faster, and cheaper analog and digital circuits, e.g., buffers, comparators, and processing circuits, to provide the information necessary to control a multilevel power converter. As a result, the power conversion circuit disclosed herein is faster, cheaper, and requires a smaller footprint area on a circuit board.

In one exemplary embodiment, a power conversion circuit comprises a multilevel power converter, a current detection circuit, a first capacitor voltage detection circuit, and a control circuit. The multilevel power converter has a number of levels greater than or equal to three, and comprises a first capacitor connected in parallel with a plurality of power switches serially connected between a top power switch and a bottom power switch. The multilevel power converter also includes an inductor connected between an output node and a midpoint node connected at a midpoint of the plurality of power switches. The current detection circuit is configured to indirectly measure a direction of the current of the inductor based on one of a comparison between a first voltage, e.g., VBAT, and a top voltage associated with the top power switch and a comparison between a second voltage, e.g., ground, and a bottom voltage associated with the bottom power switch. The first capacitor voltage detection circuit is connected in parallel with the first capacitor, and is configured to detect a first capacitor voltage across the first capacitor and to generate a first logic signal based on a comparison between the first capacitor voltage and a first reference voltage. The control circuit is connected to an input of each of the power switches, and is configured to select an operating state of the multilevel power converter to regulate the first capacitor voltage across the first capacitor based on the indirectly measured direction of the inductor current, the first logic signal, and an input command signal.

An exemplary method regulates a multilevel power converter comprising a first capacitor connected in parallel with a plurality of power switches serially connected between a top power switch and a bottom power switch, and an inductor connected between an output node and a midpoint node connected at a midpoint of the plurality of power switches, where the multilevel power converter has a number of levels greater than or equal to three. The method comprises comparing, in a first comparison, a first voltage and a top voltage associated with the top power switch, and comparing, in a second comparison, a second voltage and a bottom voltage associated with the bottom power switch. The method further comprises indirectly measuring a direction of the current of the inductor based on one of the first and second comparisons. The method further includes detecting a first capacitor voltage across the first capacitor and generating a first logic signal based on a comparison between the first capacitor voltage and a first reference voltage. Based on the indirectly measured direction of the inductor current, the first logic signal, and an input command signal, an operating state of the multilevel power converter is selected to regulate the first capacitor voltage across the first capacitor.

Another exemplary power conversion circuit comprises a multilevel power converter having three or more levels, a current detection circuit, a first capacitor voltage detection circuit, and a control circuit. The multilevel power converter comprises a first capacitor connected in parallel with a plurality of power switches serially connected between a top power switch and a bottom power switch, and an inductor connected between an output node and a midpoint node connected at a midpoint of the serially connected power switches. The current detection circuit is configured to indirectly measure a direction of an inductor current between the midpoint node and the output node based on one of a comparison between a battery voltage and a top voltage associated with the top power switch and a comparison between a ground voltage and a bottom voltage associated with the bottom power switch. The first capacitor voltage detection circuit is connected in parallel with the first capacitor and is configured to detect a first capacitor voltage across the first capacitor and to generate a first logic signal based on a comparison between the first capacitor voltage and a first reference voltage. The control circuit is connected to an input of each of the power switches, and is configured to control the power switches based on the indirectly measured direction of the inductor current, the first logic signal, and an input command signal to regulate a first capacitor voltage across the first capacitor and to generate a target voltage level at the midpoint node.

In another exemplary embodiment, a power conversion circuit comprises a multilevel power converter, a current detection circuit, a capacitor voltage detection circuit, and a control circuit. The multilevel power converter comprises a capacitor connected in parallel with two middle power switches serially connected between a top power switch and a bottom power switch. The multilevel power converter also includes an inductor connected between an output node and a midpoint node connected at a midpoint of the middle power switches. The current detection circuit is configured to indirectly measure a direction of the current of the inductor based on one of a comparison between a first voltage, e.g., VBAT, and a midpoint voltage associated with the midpoint node and a comparison between a second voltage, e.g., ground, and the midpoint voltage. The capacitor voltage detection circuit is connected in parallel with the capacitor, and is configured to detect a capacitor voltage across the capacitor and to generate a logic signal based on a comparison between the capacitor voltage and a reference voltage. The control circuit is connected to an input of each of the power switches, and is configured to select an operating state of the multilevel power converter to regulate the capacitor voltage across the capacitor based on the indirectly measured direction of the inductor current, the logic signal, and an input command signal.

An exemplary method regulates a multilevel power converter comprising a capacitor connected in parallel with two middle power switches serially connected between a top power switch and a bottom power switch, and an inductor connected between an output node and a midpoint node connected at a midpoint of the middle power switches. The method comprises comparing, in a first comparison, a first voltage and a middle voltage associated with the midpoint node, and comparing, in a second comparison, a second voltage and the middle voltage. The method further comprises indirectly measuring a direction of the current of the inductor based on one of the first and second comparisons. The method further includes detecting a capacitor voltage across the capacitor and generating a logic signal based on a comparison between the capacitor voltage and a reference voltage. Based on the indirectly measured direction of the inductor current, the logic signal, and an input command signal, an operating state of the multilevel power converter is selected to regulate the capacitor voltage across the capacitor.

DETAILED DESCRIPTION

For simplicity, the details of the power conversion circuit disclosed herein are provided with respect to a multilevel power converter having one capacitor $C_{MID}$ and four power switches. It will be appreciated, however, that the principles disclosed herein can be extended to any multilevel converter having additional capacitors and power switches.

Figure 1:
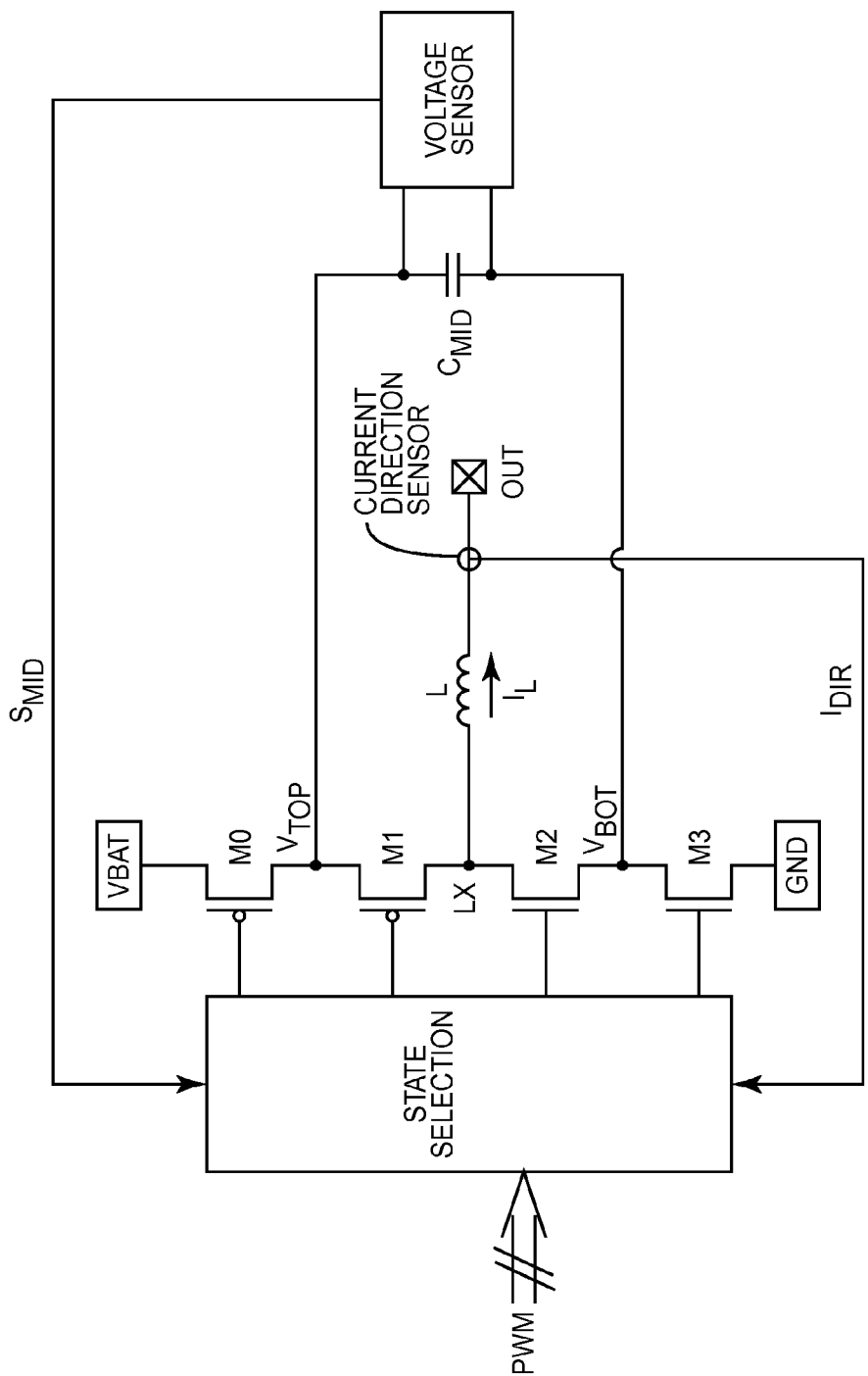
FIG. 1 shows a conventional power conversion circuit for a power converter comprising a single flying capacitor.
Figure 2:
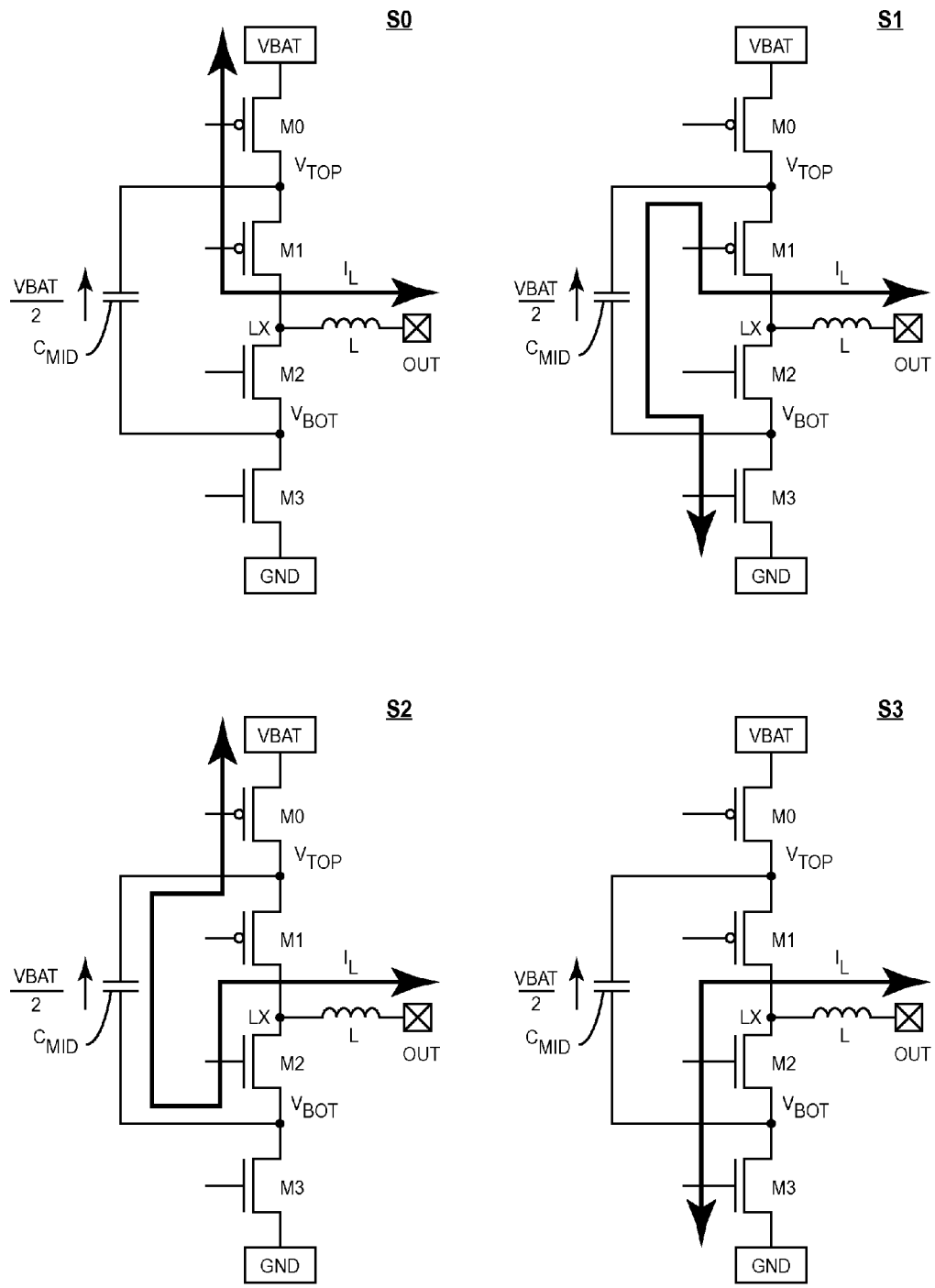
FIG. 2 shows the current flow through the power converter for the four possible different states.

FIG. 1 shows a conventional power conversion circuit including a state selection circuit, a multilevel power converter, an inductor L, a middle capacitor, also referred to as a flying capacitor $C_{MID}$, a current sensor, and a voltage sensor. As depicted in FIG. 1, the multilevel power converter includes four power switches: a top switch M0, a bottom switch M3, and two additional switches, M1 and M2, serially connected between the top and bottom switches. The inductor L is connected between an output node and a midpoint node. The flying capacitor $C_{MID}$ is connected in parallel with M1 and M2. When the voltage across $C_{MID}$ equals half the power supply voltage, e.g., ½VBAT, the multilevel power converter can be configured in one of four operational configurations or states, as shown in Table 1, which is reproduced below. State S1 and state S2 both generate the level ½VBAT on the LX node, and thus are referred to as redundant states. FIG. 2 shows the current flow through the multilevel power converter and the inductor for each of the four possible states.

TABLE 1

Multilevel power converter Configurations

| STATE | M0  | M1  | M2  | M3  | V(LX)  |
|-------|-----|-----|-----|-----|--------|
| S0    | ON  | ON  | OFF | OFF | VBAT   |
| S1    | OFF | ON  | OFF | ON  | ½ VBAT |
| S2    | ON  | OFF | ON  | OFF | ½ VBAT |
| S3    | OFF | OFF | ON  | ON  | 0      |

The power switches in the multilevel power converter are grouped in pairs, where one high side power switch and one low side power switch forms a pair. Thus, in the example of FIG. 1, M0 and M3 form one pair, and M1 and M2 form a second pair. As shown in Table 1 and FIG. 2, only one power switch in each pair is active at any given time.

The functionality of the power conversion relies on the correct balancing of $C_{MID}$. For the power converter of FIG. 1, the voltage across $C_{MID}$ is maintained at ½VBAT. Several techniques already exist for achieving this goal, e.g., the natural balancing techniques disclosed by Yuan and the active regulation techniques disclosed by Song and by Khazraei. FIG. 1 depicts the general block diagram of a power converter that uses RSS flying voltage regulation. In addition to the multilevel power converter already discussed, the converter of FIG. 1 features a current direction sensor, the output of which provides an indication of one of two possible states that indicate the direction $I_{DIR}$ of the current $I_L$ in the inductor L. For example, $I_{DIR}$ may be 1 when $I_L$ is positive and 0 when $I_L$ is negative. The voltage sensor senses the voltage across $C_{MID}$ and outputs $S_{MID}$, which also provides an indication of one of two possible states, and which identifies whether the voltage level across $C_{MID}$ is above or below the desired voltage, e.g., ½VBAT. When the voltage across $C_{MID}$ is above ½VBAT, for example, $S_{MID}$ is 1. When the voltage across $C_{MID}$ is below ½VBAT, for example, $S_{MID}$ is 0.

The state selection circuit selects the state for the multilevel power converter based on $IL_{DIR}$, $S_{MID}$, and PWM, which is a command signal generated by a controller (not shown) to dictate a voltage to be generated at the LX node. The command signal PWM has one of three values: 0, 1, or 2 to set the voltage at the LX node to 0V, ½VBAT, or VBAT, respectively. Table 2 shows how the state selection circuit selects the state for the multilevel power converter, where "X" indicates that the value for $I_{DIR}$ and $S_{MID}$ are irrelevant for the selection of those particular states/PWM.

TABLE 2

STATE SELECTION CIRCUIT DECISION TABLE

| PWM | $I_{DIR}$ | $S_{MID}$ | state |
|-----|-----------|-----------|-------|
| 0   | X         | X         | S3    |
| 1   | 0         | 0         | S1    |
| 1   | 0         | 1         | S2    |
| 1   | 1         | 0         | S2    |
| 1   | 1         | 1         | S1    |
| 2   | X         | X         | S0    |

Figure 3:
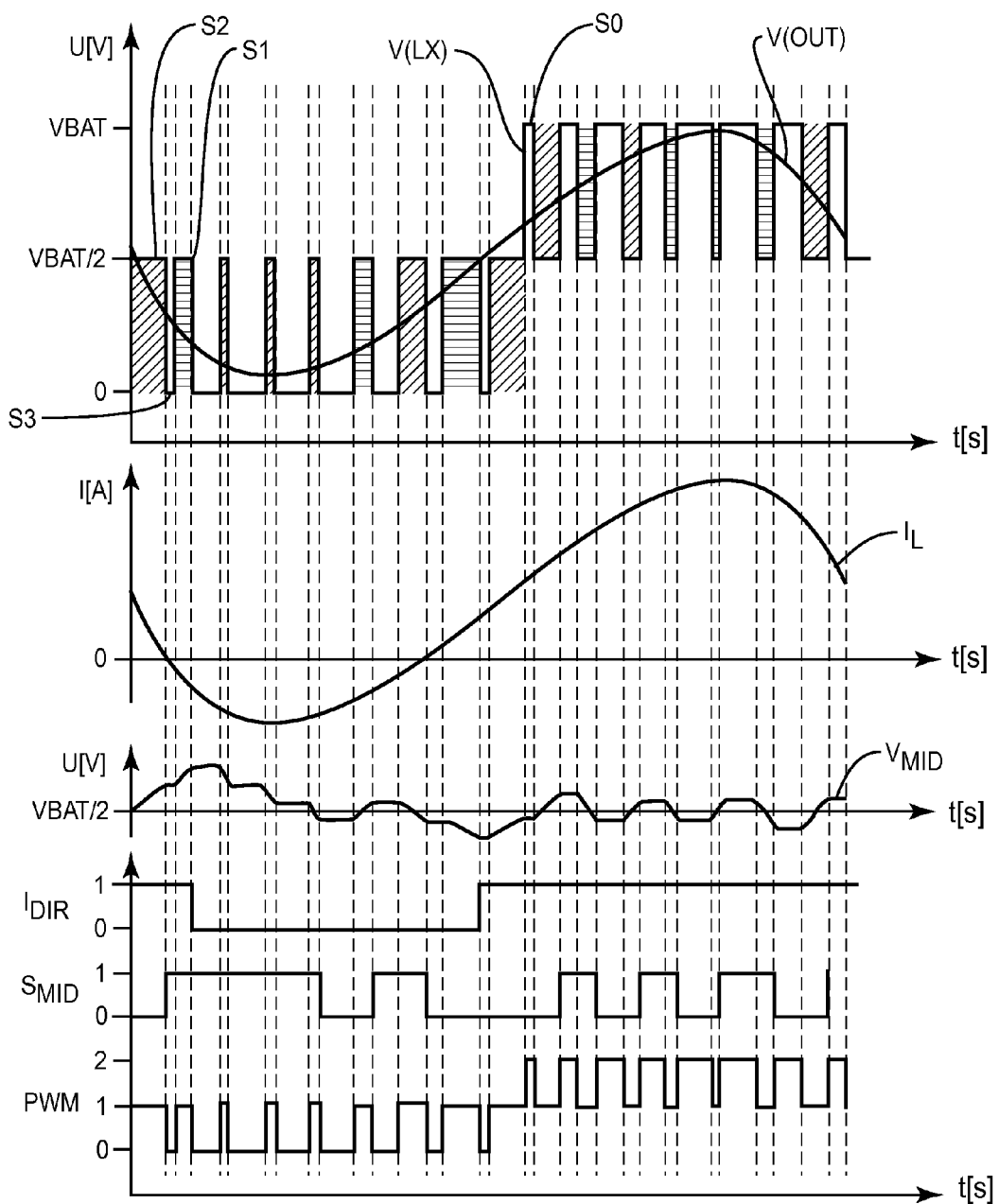
FIG. 3 shows a signaling diagram for the conventional power conversion circuit of FIG. 1.

Applying this decision table to the multilevel power converter regulates the voltage across $C_{MID}$ to a desired level, as shown in the signalling diagram of FIG. 3, which was generated based on the assumption that the OUT node is connected to a ground capacitance and where the effect of the resistance associated with conducting power switches is neglected for the V(LX) voltage.

The conventional power conversion techniques were developed mainly for power inverters, and therefore, for applications using discrete switching elements with voltages on the order of several hundred volts and switching frequencies in the range of 1 to 10 kHz. As a result, a digital signal processor (DSP) or computer implements the voltage sensor and/or state selection circuit, a discrete Hall Effect sensor implements the current sensing in the coil, and digital-to-analog converters are typically used to ensure accurate conversion of the analog signals to digital. When using such converters in a mobile communication device, e.g., as a power supply for an RF power amplifier in an envelope tracking application inside a mobile communication device, the power conversion circuit should be high speed (e.g., switching frequencies in the range of 50 to 200 MHz), and should fit in a reasonably small area of an integrated circuit (IC) to satisfy both price and footprint constraints. Because Hall Effect sensors, DACs, and DSPs are slow, large, and costly solutions, the conventional techniques are not suitable for mobile communication device applications.

Figure 4:
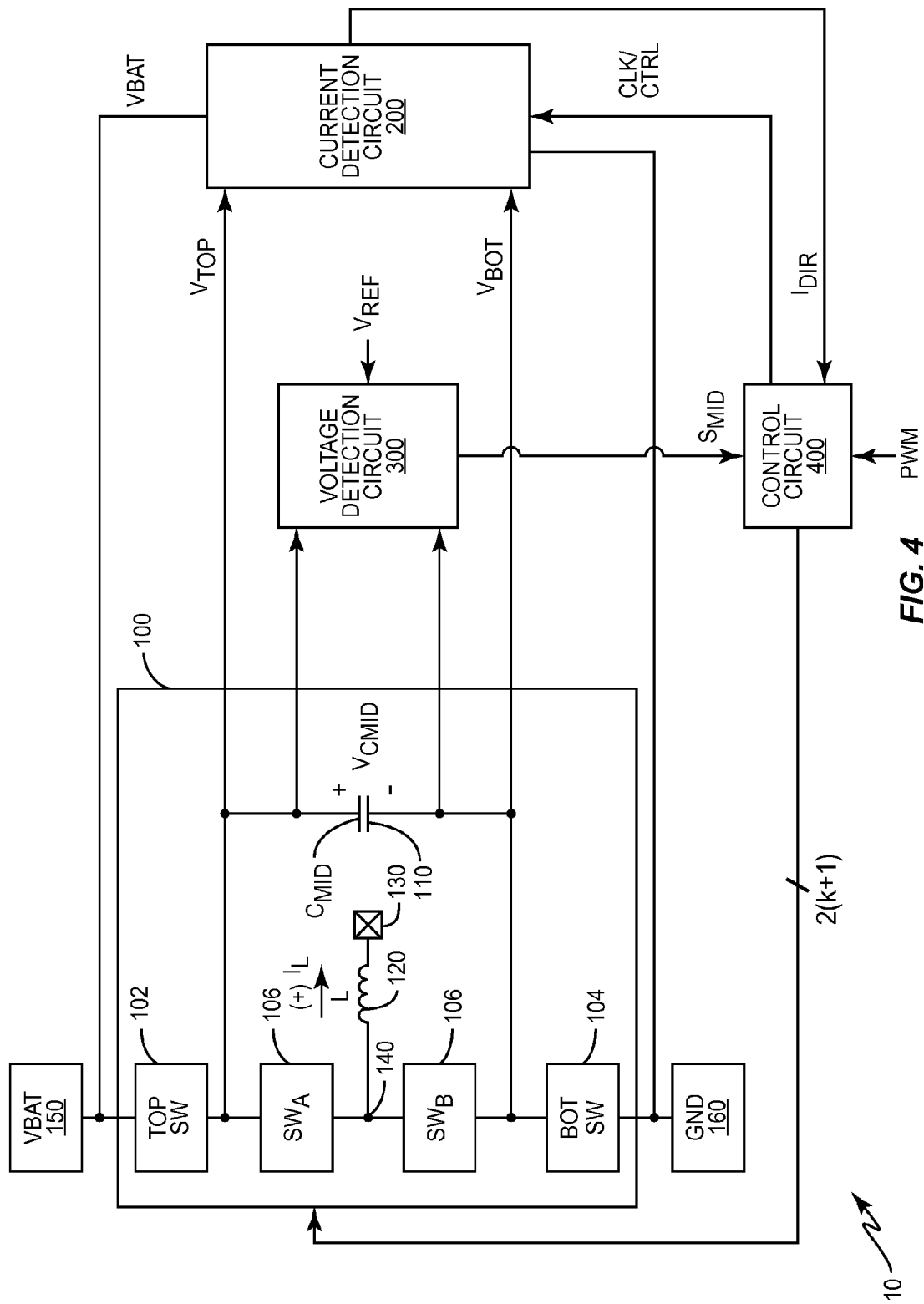
FIG. 4 shows a block diagram of a power conversion circuit according to one exemplary embodiment.

FIG. 4 shows a block diagram of a power conversion circuit 10 according to an exemplary embodiment that is faster, smaller, and cheaper than the conventional solutions. To that end, power conversion circuit 10 includes a multilevel power converter 100, a current detection circuit 200, a capacitor voltage detection circuit 300, and a control circuit 400. The multilevel power converter 100 comprises k capacitors, e.g. capacitor $C_{MID}$ 110, which may be referred to as a flying capacitor, an inductor L 120, and N levels (also referred to herein as non-redundant operating states), where N≥3. Multilevel power converter 100 also comprises a plurality of power switches 106 serially connected between a top power switch 102 and a bottom power switch 104, where the top power switch 102 connects to VBAT 150 and the bottom power switch 104 connects to ground 160. The capacitor $C_{MID}$ 110 connects in parallel with the plurality of switches 106, and L 120 connects between an output node 130 and the midpoint node 140 between the plurality of power switches 106. While FIG. 4 shows first and second voltages equivalent to VBAT and ground, the first and second voltages may comprise any predetermined voltage levels, where the first voltage 150 exceeds the second voltage 160. The 2(k+1) power switches 102, 104, 106 may be grouped in pairs, where the top switch 102 and bottom switch 104 form one pair, and the two middle switches 106 form a second pair in the example of FIG. 4. As previously discussed, only one power switch in each pair is active at any given time. Further, while the embodiment of FIG. 4 only shows four power switches 102, 104, 106 and one capacitor 110, the multilevel power converter 100 can include any number of capacitors and power switches, where the number of power switches 102, 104, 106 is generally associated with the number of flying capacitors. For example, for a power conversion circuit 10 having k flying capacitors, the multilevel power converter 100 has 2(k+1) power switches 102, 104, 106 having 2(k+1) input control lines from the control circuit 400 that control the power switches 102, 104, 106.

Figure 5:
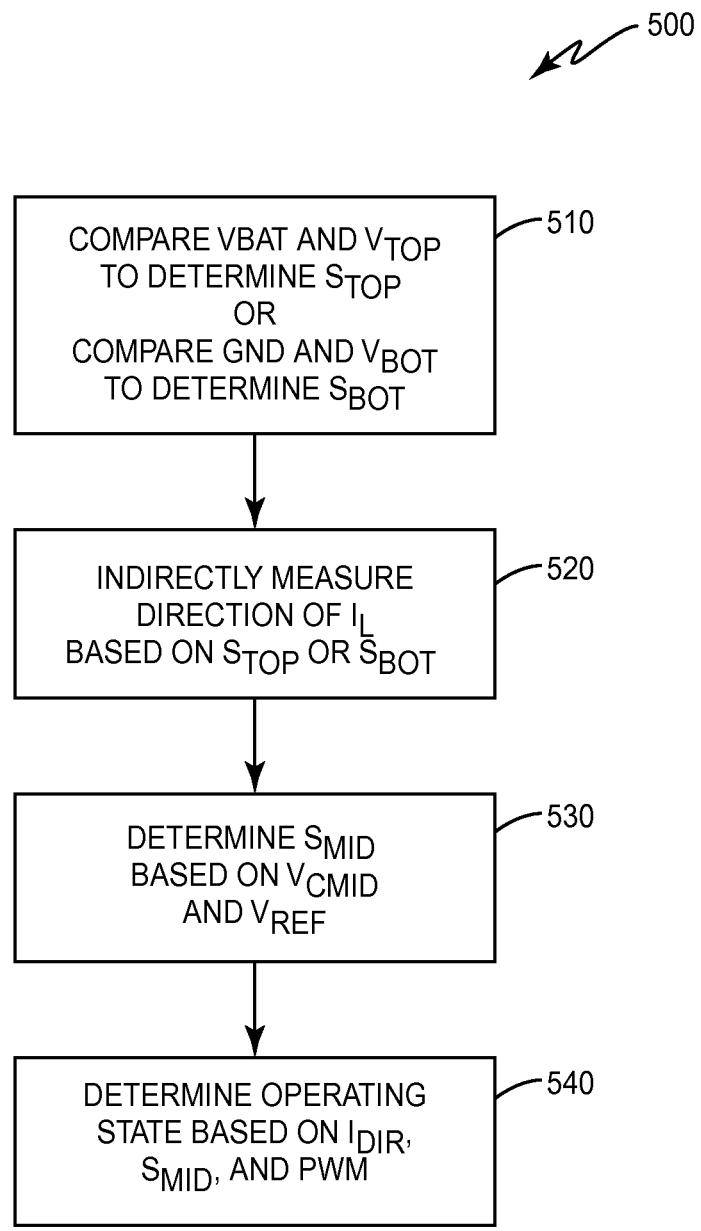
FIG. 5 shows a power conversion method according to one exemplary embodiment.

FIG. 5 shows an exemplary method 500 of regulating the multilevel power converter 100 of FIG. 4. It will be appreciated that the order of the steps presented in FIG. 5 is exemplary and should not be considered as limiting. Current detection circuit 200 indirectly measures a direction of the current $I_{dir}$ in the inductor L 120 based on VBAT 150, ground 160, a top voltage $V_{TOP}$ output by the multilevel power converter 100, and a bottom voltage $V_{BOT}$ output by the multilevel power converter 100. As shown in FIG. 4, the positive direction of the inductor current may be interpreted as flowing from the midpoint node 140 to the output node 130. The current detection circuit 200 compares the first voltage 150, e.g., VBAT, to the top voltage $V_{TOP}$ to generate a top signal $S_{TOP}$, or compares the second voltage 160, e.g., ground, to the bottom voltage $V_{BOT}$ to generate a bottom signal $S_{BOT}$ (block 510). Based on $S_{TOP}$ or $S_{BOT}$, the current detection circuit indirectly measures the direction of the inductor current (block 520) and outputs a logic value $I_{dir}$.

The capacitor voltage detection circuit 300 detects a voltage $V_{MID}$ associated with $C_{MID}$ 110, and generates a logic signal $S_{MID}$ based on a comparison between $V_{MID}$ and a reference voltage $V_{REF}$ (block 530). Based on $I_{dir}$, $S_{MID}$, and an input command signal PWM, the control circuit 400 selects an operating state of the multilevel power converter 100, e.g., one of the states in Table 1, to regulate the voltage across the $C_{MID}$ 110 and to generate a target voltage at the midpoint node 140 (block 540).

Unlike conventional power conversion solutions, the power conversion circuit 10 of FIG. 4 uses a current detection circuit 200 that indirectly measures the direction of the inductor current using various voltage comparisons implemented using faster, cheaper, and smaller, analog and digital circuits, and thus avoids the need for the bulky and costly conventional current detectors, e.g., Hall effect sensors. More particularly, when one or more of the power switches connected between VBAT 150 and a midpoint node 140 are active, the inductor current passes through the active power switches and generates a voltage drop, e.g., $V_{TOP}$–VBAT, across the active power switches due to the non-zero resistance associated with these active power switches. Similarly, when one or more of the power switches connected between the midpoint node 140 and ground 160 are active, the inductor current passes through the active power switches and generates a voltage drop, e.g., $V_{BOT}$–GND, across the active power switches due to the non-zero resistance associated with these active power switches. The current detection circuit 200 uses these voltages to determine a direction of the inductor current.

Figure 6:
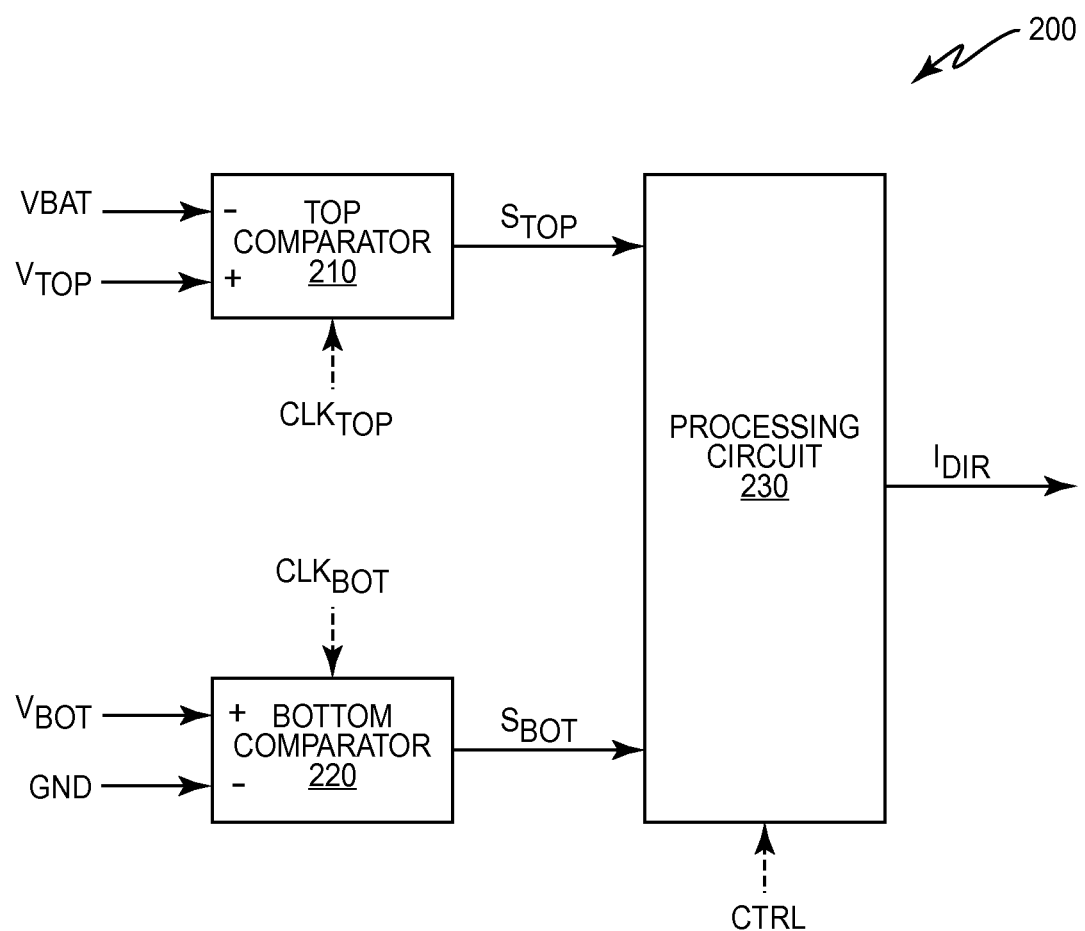
FIG. 6 shows a block diagram of a current detection circuit for the power conversion circuit of FIG. 4 according to one exemplary embodiment.

FIG. 6 shows a block diagram for one exemplary current detection circuit 200 comprising a top comparator 210, a bottom comparator 220, and a processing circuit 230. When triggered by a clock signal, e.g., $CLK_{TOP}$, the top comparator 210 outputs a top signal $S_{TOP}$ based on a comparison between VBAT 150 and the top voltage $V_{TOP}$. When triggered by another clock signal, e.g., $CLK_{BOT}$, the bottom comparator 220 outputs a bottom signal $S_{BOT}$ based on a comparison between ground 160 and the bottom voltage $V_{BOT}$. The processing circuit 230 determines the direction of the inductor current based on $S_{TOP}$ or $S_{BOT}$.

For example, assume the power switches 102, 104, 106 have a non-zero resistance when turned on, e.g., $R_{on}$. Thus, the inductor current induces a voltage drop $I_L R_{on}$ across any active power switch. As a result, when the top power switch 102 is conducting, a comparison between $V_{TOP}$ and VBAT in top comparator 210 is negative when $V_{TOP}$<VBAT and thus the inductor current is flowing from the midpoint node 140 to the output node 130 and $I_L$ is positive, and is positive when $V_{TOP}$>VBAT and thus the inductor current is flowing from the output node 130 to the midpoint node 140 and $I_L$ is negative. Thus, when top power switch 102 is conducting, the top comparator 210 outputs, e.g., a 0 when $I_L$ is positive and a 1 when $I_L$ is negative, when triggered by the top clock signal. Alternatively, when the bottom power switches 104 is conducting, a comparison between $V_{BOT}$ and ground in bottom comparator 220 is negative when $V_{BOT}$<VBAT and thus the inductor current is flowing from the midpoint node 140 to the output node 130 and $I_L$ is positive, and is positive when $V_{BOT}$>VBAT and thus the inductor current is flowing from the output node 130 to the midpoint node 140 and $I_L$ is negative. As a result, when the bottom power switch 104 is conducting, the bottom comparator 220 outputs, e.g., a 0 when $I_L$ is positive and a 1 when $I_L$ is negative, when triggered by the bottom clock signal. Thus, the processing circuit 230 determines the direction of the current based on which comparator 210, 220 provides an output, and the actual value of $S_{TOP}$ or $S_{BOT}$.

FIG. 6 shows that the top and bottom comparators 210, 220 are triggered by respective top and bottom clock signals. The invention disclosed herein, however does not require such triggers. In an alternative embodiment, the control circuit 400 may send a control signal CTRL to the processing circuit 230, e.g., as shown in FIG. 4, to control whether the processing circuit 230 retrieves $S_{TOP}$ from the top comparator 210 or retrieves $S_{BOT}$ from the bottom comparator 220. Once the processing circuit 230 retrieves the preferred value, the processing circuit 230 operates as previously described.

Figure 7:
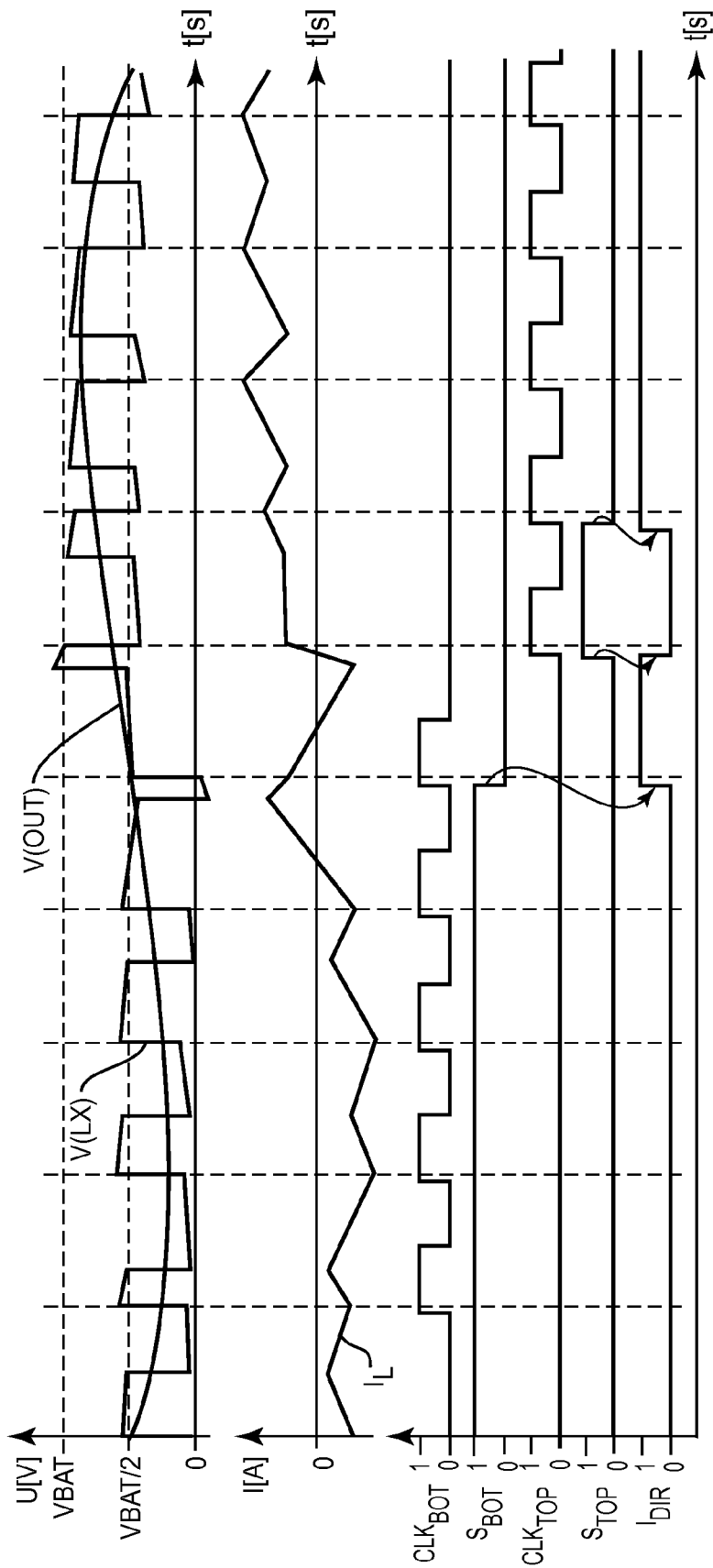
FIG. 7 shows an exemplary signaling diagram for the current detection circuit of FIG. 6 according to one exemplary embodiment.

FIG. 7 shows a signaling diagram illustrating this process, where the operational state of the power switches determines which comparator is triggered and where the effect of the resistance associated with conducting power switches is emphasized for the voltage at node 140. For states S0 and S2, the top power switch 102 is conducting, and thus the top comparator 210 is used. For states S1 and S3, the bottom power switch 104 is conducting, and thus the bottom comparator 220 is used. In FIG. 7, each time the input command signal PWM changes and the next level is one of the redundant states (e.g., S1 or S2), then one of the comparators 210, 220 is activated to determine the current direction. If the next level is not generated by one of the redundant states, there is no need to trigger either comparator.

The current detection circuit 200 disclosed herein eliminates the need for a Hall Effect sensor and other external components, and thus reduces the cost and footprint of the power conversion circuit. Further, triggered comparators can operate in the 100 MHz range. Therefore, the use of triggered comparators also increases the speed at which current direction, and thus state selection decisions, can be made.

Figure 8:
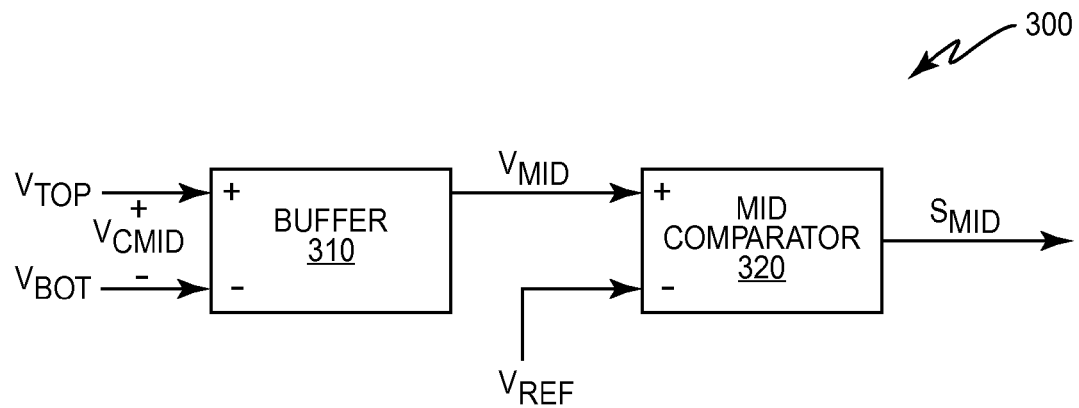
FIG. 8 shows a block diagram of a capacitor voltage detection circuit for the power conversion circuit of FIG. 4 according to one exemplary embodiment.

Additional cost, size, and speed improvements may be achieved by the voltage detector 300. FIG. 8 shows a block diagram of one exemplary voltage detector 300 comprising a buffer 310 and a comparator 320, referred to herein as a "mid comparator" because it is connected in parallel with $C_{MID}$. Buffer 310 is an operational amplifier in a differential configuration that translates the voltage $V_{CMID}$ across $C_{MID}$ 110 to a single-ended voltage, referred to herein as $V_{MID}$. For the power converter 100 of FIG. 4, the voltage across the capacitor $V_{CMID}$ is the difference between $V_{TOP}$ and $V_{BOT}$. Mid comparator 320 therefore compares $V_{MID}$ to a reference voltage $V_{REF}$, e.g., ½VBAT, to generate a comparison signal $S_{MID}$. It will be appreciated that other reference voltages may be used. The comparison signal $S_{MID}$ is provided to the control circuit 400 to enable the control circuit 400 to determine if the voltage $V_{CMID}$ across $C_{MID}$ 110 is above or below the reference voltage, and therefore, whether $C_{MID}$ needs to be charged or discharged.

Figure 9:
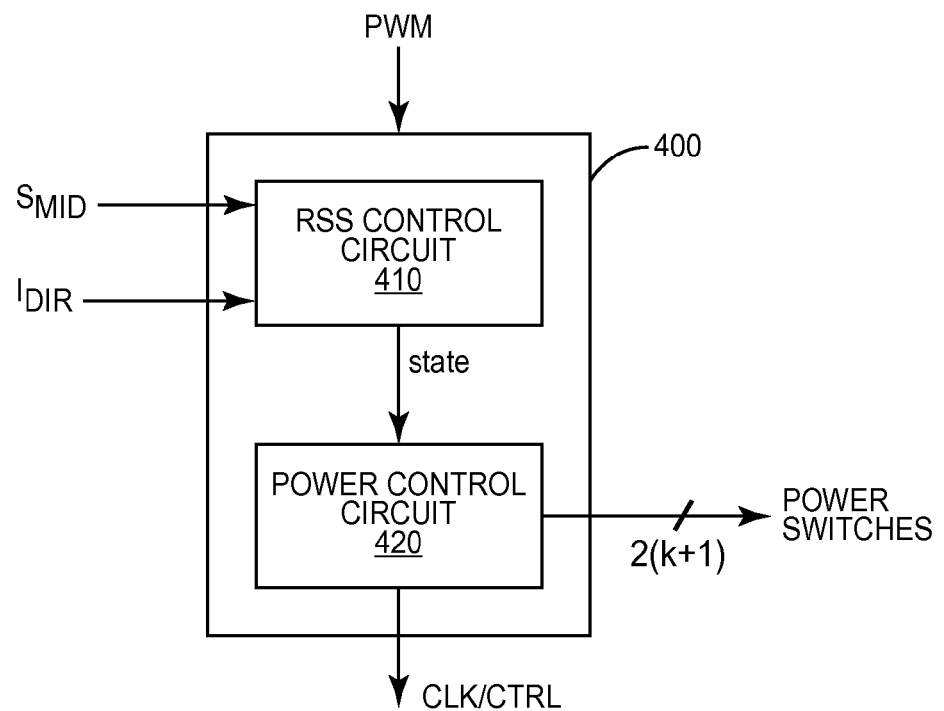
FIG. 9 shows a block diagram of a control circuit for the power conversion circuit of FIG. 4 according to one exemplary embodiment.
Figure 10:
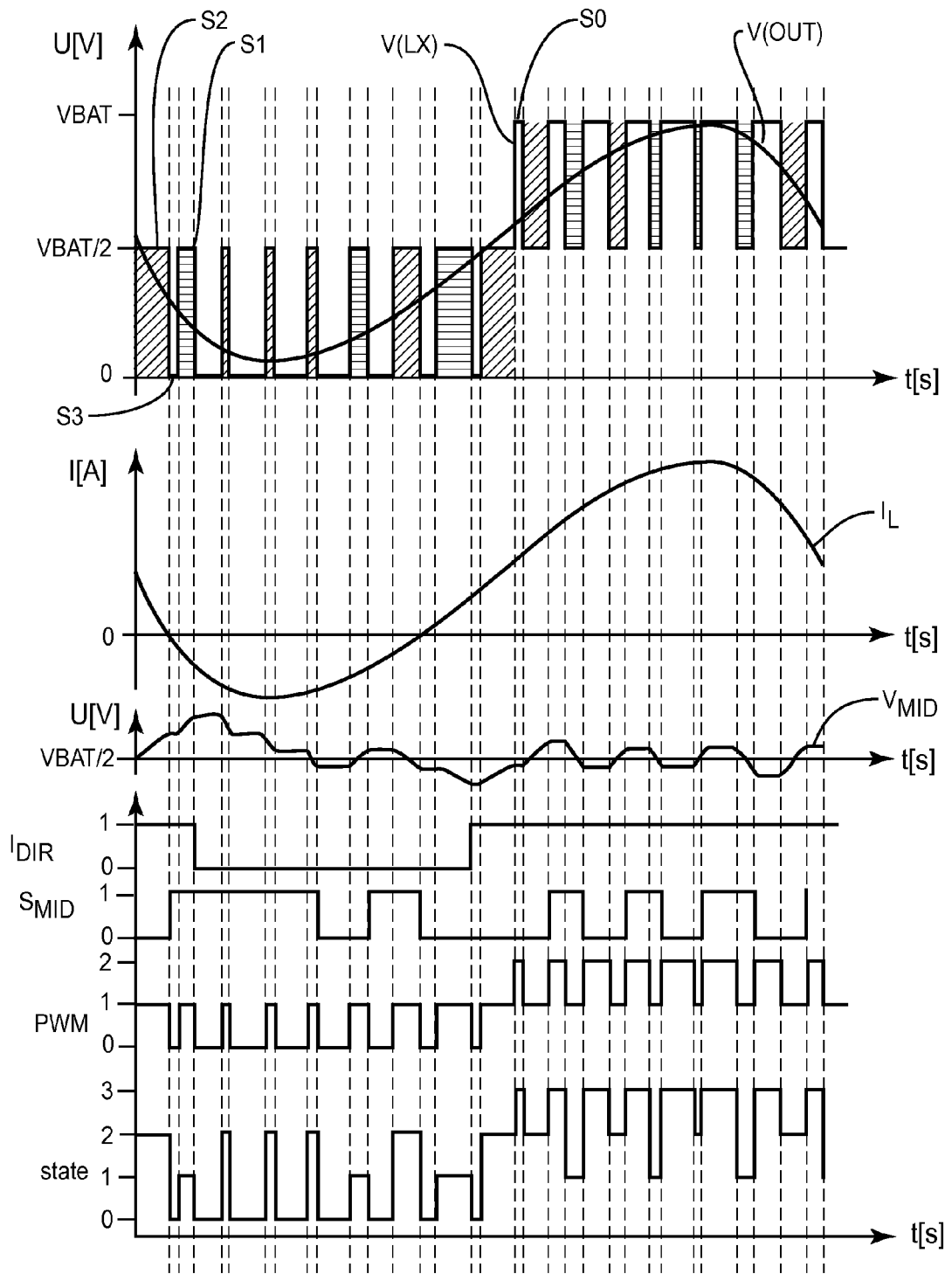
FIG. 10 shows a signaling diagram for the exemplary power conversion circuit of FIG. 4.

The control circuit 400 selects the operating state of the multilevel power converter 100, and thus the configuration of each of the power switches 102, 104, 106, based on the input command signal PWM, the indirectly measured inductor current direction $I_{dir}$, and the comparison signal $S_{MID}$ according to Table 2. For example, the control circuit 400 may include a redundant state selection (RSS) control circuit 410 and a power control circuit 420, as shown in FIG. 9. The RSS control circuit 410 selects the operating state of the multilevel power converter 100 based on $I_{dir}$, $S_{MID}$, and PWM according to Table 2. The power control circuit 420 controls the 2(k+1) power switches 102, 104, 106 based on the selected operating state and PWM to regulate the voltage across $C_{MID}$ 110 and to generate a target voltage at the midpoint node 140. Thus, the control circuit 400 is able to use existing algorithms to control the multilevel power converter 100 based on information obtained using smaller, faster, and cheaper circuit elements. FIG. 10 shows the various signals for the power conversion circuit 10 for the example of FIG. 4 when $V_{REF}$=½VBAT, where the effect of the resistance associated with conducting power switches is neglected for the voltage at node 140.

Figure 12:
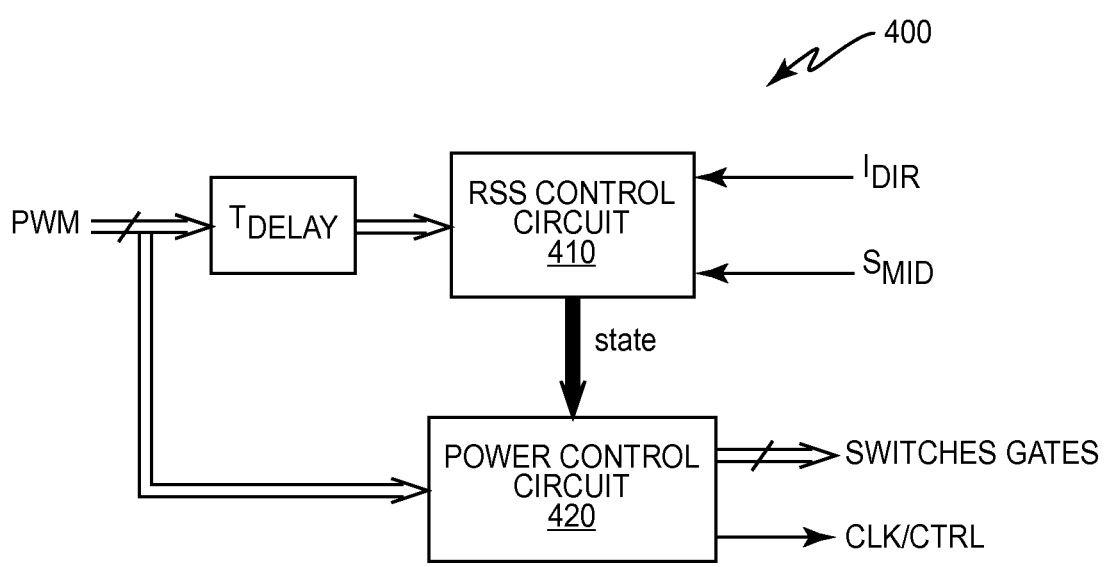
FIG. 12 shows an example of the operation of the control circuit of FIG. 9.

The control circuit 400 also generates the clock signals controlling the comparators or the CTRL signal controlling the processing circuit 230 in the current detection circuit 200, e.g., as shown in FIG. 12. In one embodiment, the control circuit 400 generates the top and bottom clock signals (or CTRL signal) based on the input command signal PWM, which indicates the desired voltage for the midpoint node 140, and the current operational state of the power switches. In general, power control circuit 420 either triggers the top comparator 210 using $CLK_{TOP}$ or the bottom comparator 220 using $CLK_{BOT}$ based on the current operational state of the power switches in the multilevel power converter 100. When the command signal PWM changes state, and before this new PWM leads to a new operational state of the power switches 102, 104, 106, the power control circuit 420 triggers either $CLK_{TOP}$ or $CLK_{BOT}$, depending on the current operational state of the power switches 102, 104, 106. After a slight delay $T_{delay}$, $S_{TOP}$ (or $S_{BOT}$) becomes available to the processing circuit 230, enabling the processing circuit 230 to provide the last up-to-date current direction in the inductor 120 to the RSS control circuit 410. After $T_{delay}$, the RSS control circuit 410 sees the change in the command signal PWM, and selects a new operating accordingly. After the RSS control circuit 410 selects the new operating state, the power control circuit 420 changes the configuration of the 2(k+1) power switches 102, 104, 106 based on the new PWM and the new operating state selected based on the new current direction.

A similar process also applies when a control signal applied to the processing circuit 230 is used to select the desired comparator output, as opposed to using clock signals to trigger the comparators to provide the output to the processing circuit 230. In this case, based on the current operational state of the power switches 102, 104, 106, the control circuit 400 uses the control signal to inform the processing circuit 230 whether the top power switch 102 or the bottom power switch 106 is conducting. Thus, based on the control signal, the processing circuit 230 determines whether it should use $S_{TOP}$ (when the top power switch 102 is conducting) or $S_{BOT}$ (when the bottom power switch 106 is conducting) to determine the current direction to provide $I_{dir}$. When PWM changes state, the RSS control circuit 410 already has the information it needs, e.g., $I_{dir}$ and $S_{MID}$, to determine which state should be selected for the next cycle. Thus, in this example, $T_{delay}$=0.

Figure 11:
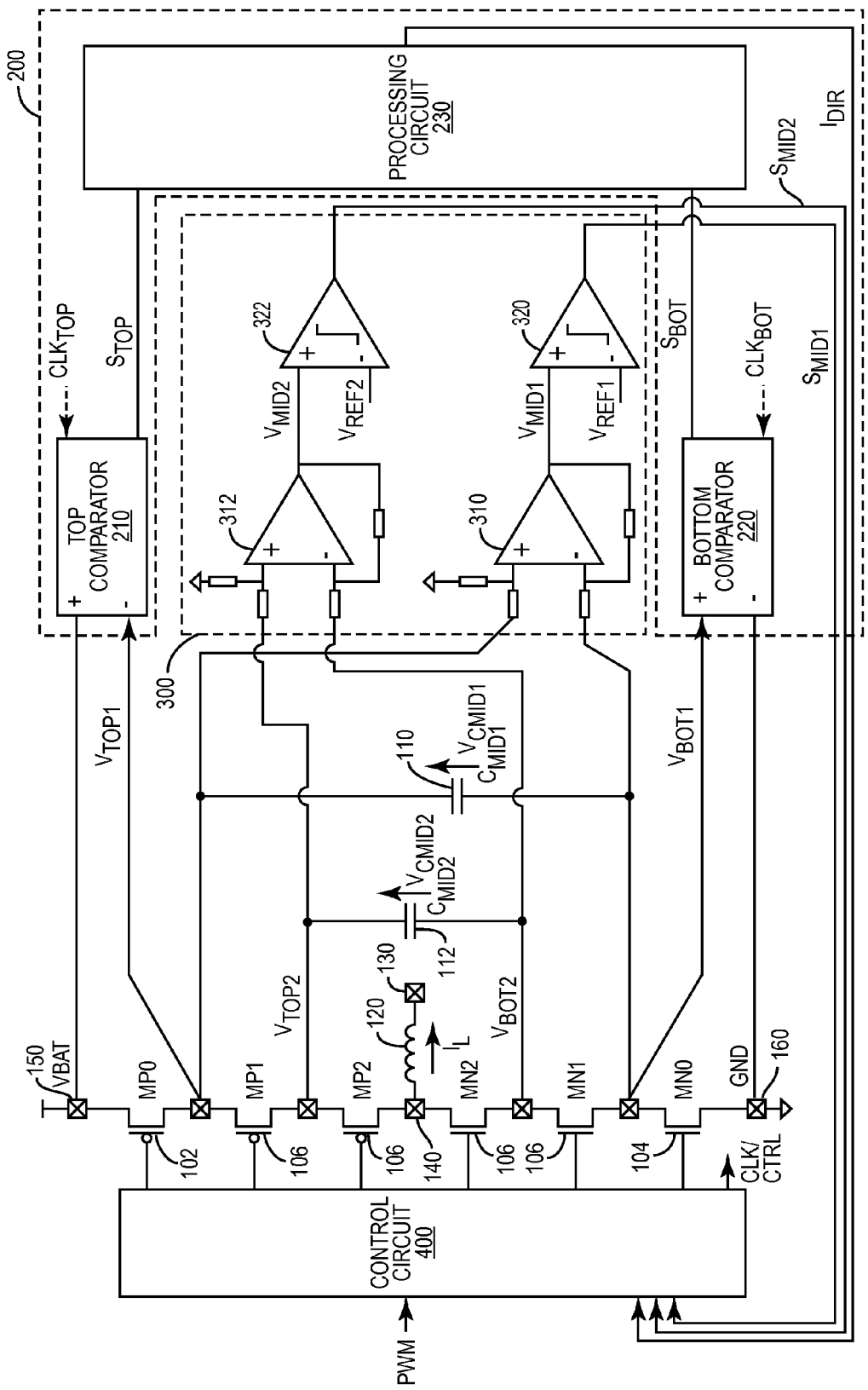
FIG. 11 shows a circuit diagram of a power conversion circuit for a power converter with two flying capacitors according to one exemplary embodiment.

The power conversion circuit 10 disclosed herein is not limited to the four power switches and one flying capacitor 110 implementation of FIG. 4. Rather, the inventive concepts disclosed herein are applicable to multilevel power converters having any number of capacitors and any even number of power switches greater than or equal to four. FIG. 11 shows an exemplary power conversion circuit 10 having six power switches and two flying capacitors $C_{MID1}$ 110 and $C_{MID2}$ 112, where $C_{MID1}$ 110 is connected in parallel with the plurality of power switches 106 disposed between the VBAT 150 and ground 160, and $C_{MID2}$ 112 is connected in parallel with a subset of the plurality of power switches 106. As shown in FIG. 11, the current detection circuit 200 is the same regardless of the number of flying capacitors. The timing associated with the current detection circuit 200 is also unchanged. The capacitor voltage detection circuit 300, however, comprises a set of the capacitor voltage detection circuitry shown in FIG. 8 such that each capacitor will be operatively connected to its own buffer/comparator capacitor voltage detection circuit. Thus, in the example of FIG. 11, a buffer 310 is connected in parallel with $C_{MID1}$ 110 in a differential configuration to translate the differential voltage $V_{CMID1}$ across $C_{MID1}$ to a first single ended voltage $V_{MID1}$. A comparator 320 compares $V_{MID1}$ to a first reference voltage $V_{REF1}$, e.g., ⅓VBAT, to determine a first logic signal $S_{MID1}$ for $C_{MID1}$. Similarly, a buffer 312 is connected in parallel with $C_{MID2}$ 112 in a differential configuration to translate the differential voltage $V_{CMID2}$ across $C_{MID2}$ to a second single ended voltage $V_{MID2}$. A comparator 322 compares $V_{MID2}$ to a second reference voltage $V_{REF2}$, e.g., ⅔VBAT, to determine a second logic signal $S_{MID2}$ for $C_{MID2}$. Both comparator outputs are provided to the control circuit 400.

Figure 13A:
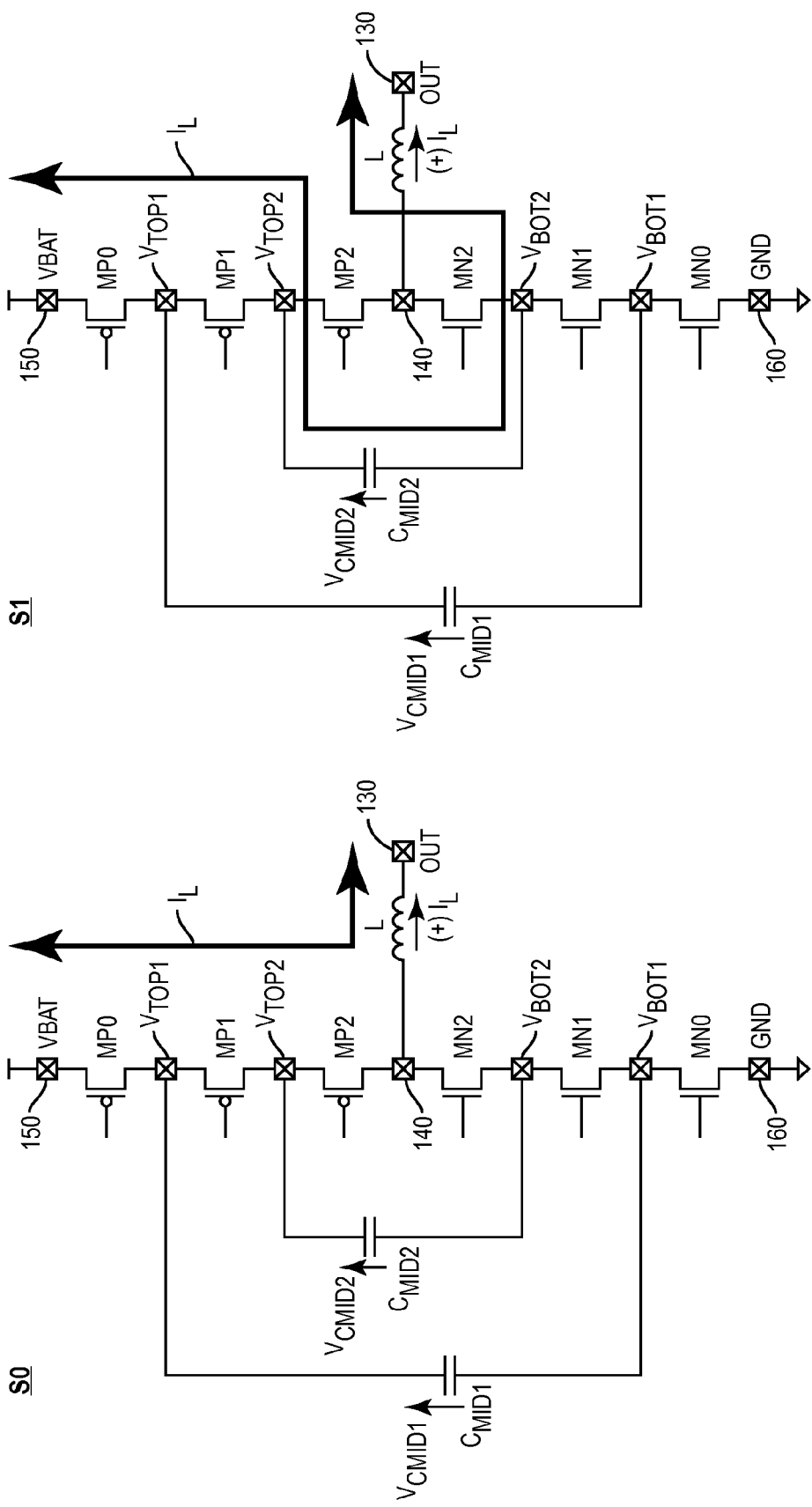
FIG. 13 (FIGS. 13A-13D) shows the current flow through the multilevel power converter of FIG. 11 for the eight possible different operating states.
Figure 13B:
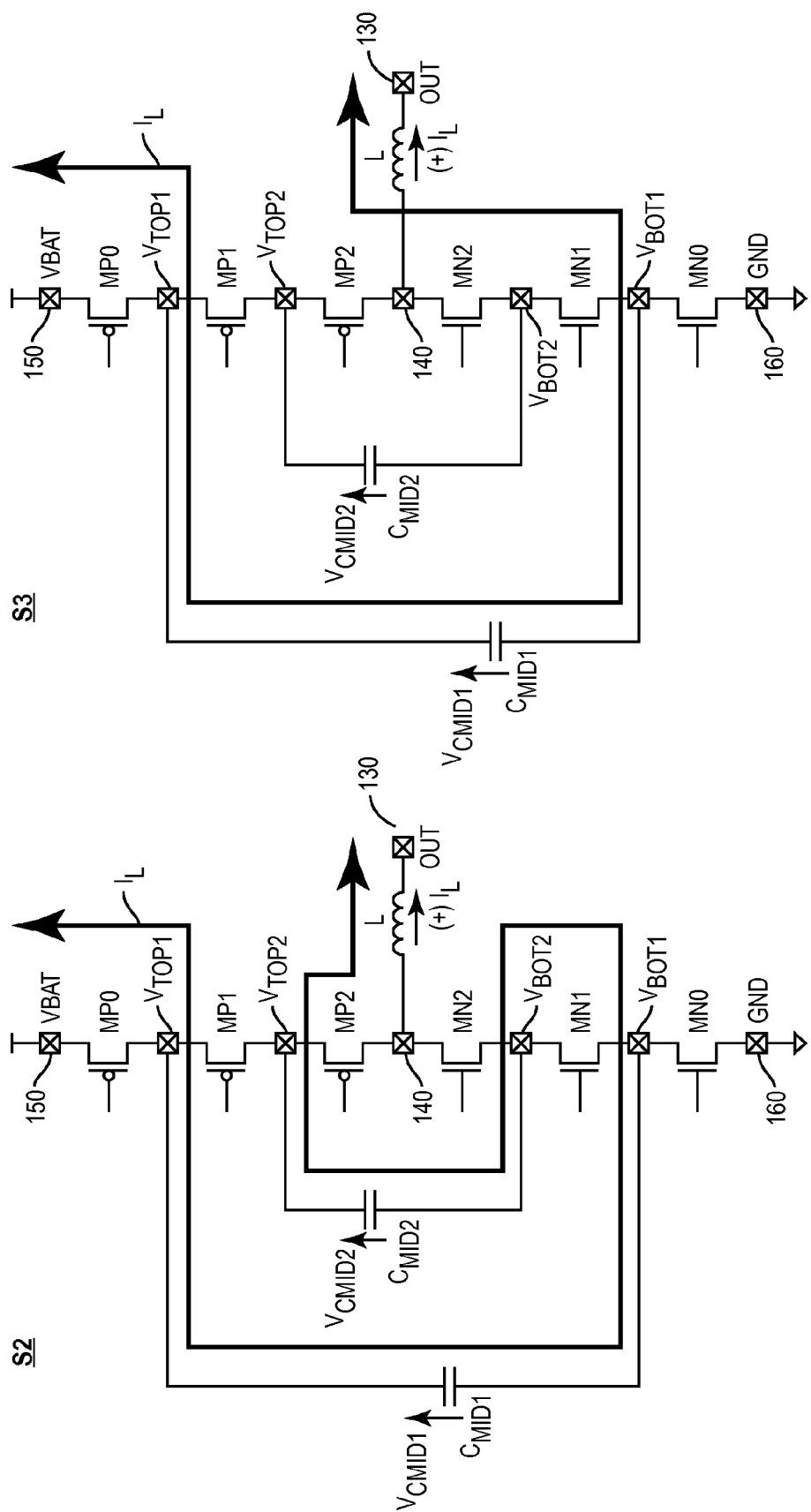
Figure 13D:
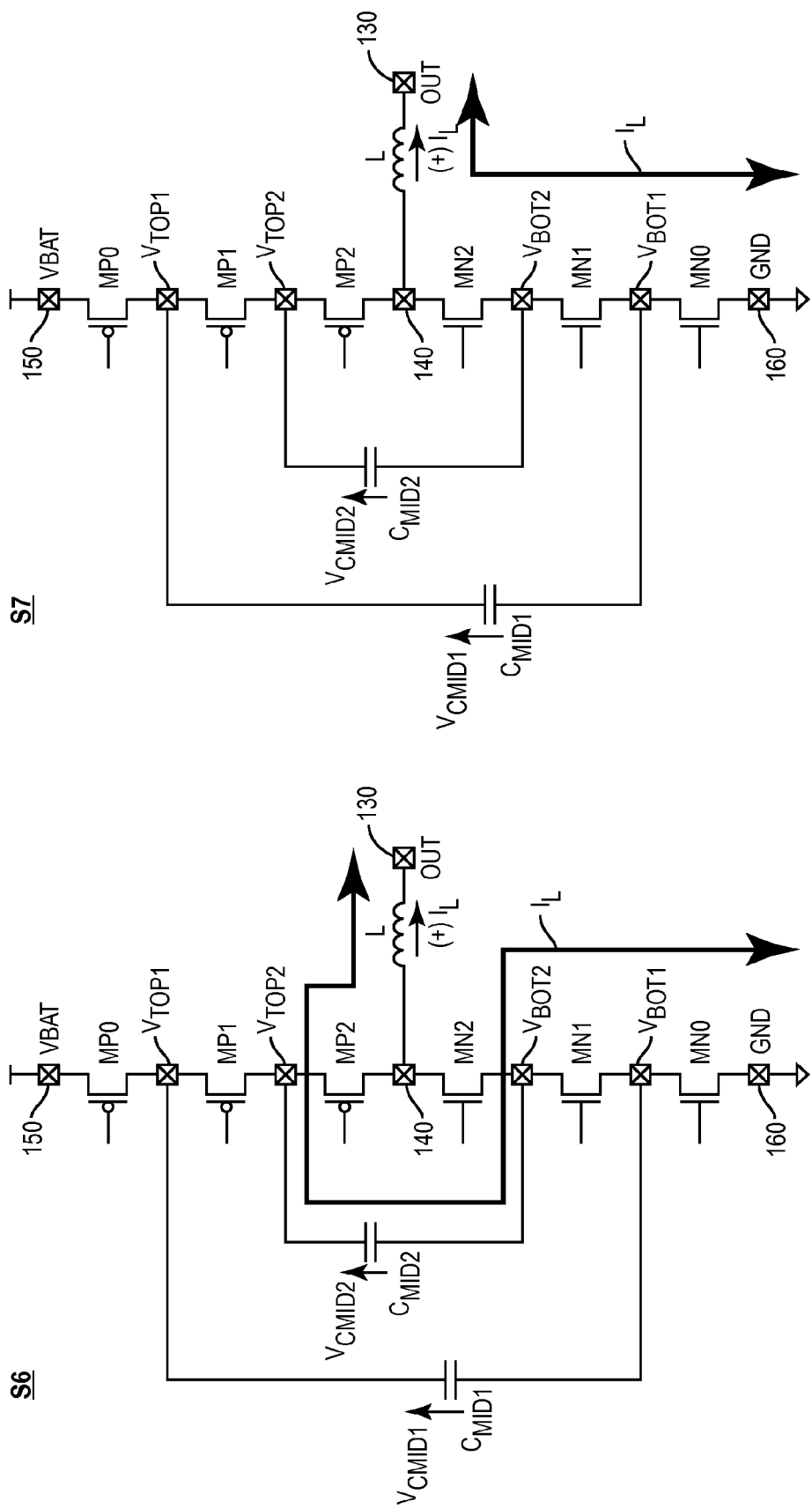

Up to eight states are possible with the configuration shown in FIG. 11. FIG. 13 (FIGS. 13A-13D) shows the current flow through the multilevel power converter 100 for each of the eight possible states shown in Table 3.

TABLE 3

Multilevel power converter Configurations

| STATE | MP0 | MP1 | MP2 | MN2 | MN1 | MN0 |
|-------|-----|-----|-----|-----|-----|-----|
| S0 | ON | ON | ON | OFF | OFF | OFF |
| S1 | ON | ON | OFF | ON | OFF | OFF |
| S2 | ON | OFF | ON | OFF | ON | OFF |
| S3 | ON | OFF | OFF | ON | ON | OFF |
| S4 | OFF | ON | ON | OFF | OFF | ON |
| S5 | OFF | ON | OFF | ON | OFF | ON |

TABLE 3-continued

Multilevel power converter Configurations

| STATE | MP0 | MP1 | MP2 | MN2 | MN1 | MN0 |
|---|---|---|---|---|---|---|
| S6 | OFF | OFF | ON | OFF | ON | ON |
| S7 | OFF | OFF | OFF | ON | ON | ON |

Table 4 shows the voltage $V_{LX}$ at the midpoint node 140 for each possible state necessary to maintain a voltage of ⅔VBAT across $C_{MID1}$ 110 and ⅓VBAT across $C_{MID2}$ 112, and to generate one of four possible output levels/operating states: 0 (for PWM=0), ⅓VBAT (for PWM=1), ⅔VBAT (for PWM=2), or VBAT (for PWM=3). Regarding the values in the capacitor columns, which assume a positive current in the inductor 120, "0" indicates the capacitor is neither charging nor discharging, "1" indicates charge the capacitor, and "−1" indicates discharge the capacitor. When the current is negative, the polarity of Charges_$C_{MID1}$ and Charges_$C_{MID2}$ is inverted.

TABLE 4

VOLTAGE AT MIDPOINT NODE

| STATE | $V_{LX}$ | Charges_$C_{MID1}$ | Charges_$C_{MID2}$ |
|---|---|---|---|
| S0 | VBAT | 0 | 0 |
| S1 | VBAT − $V_{CMID2}$ = ⅔ VBAT | 0 | 1 |
| S2 | VBAT − $V_{CMID1}$ + $V_{CMID2}$ = ⅔ VBAT | 1 | −1 |
| S3 | VBAT − $V_{CMID1}$ = ⅓ VBAT | 1 | 0 |
| S4 | $V_{CMID1}$ = ⅔ VBAT | −1 | 0 |
| S5 | $V_{CMID1}$ − $V_{CMID2}$ = ⅓ VBAT | −1 | 1 |
| S6 | $V_{CMID2}$ = ⅓ VBAT | 0 | −1 |
| S7 | 0 | 0 | 0 |

Table 5 shows how the RSS control circuit 410 selects the operating state for the multilevel power converter 100, where for the exemplary four possible output voltages, $S_{MID}=2S_{MID2}+S_{MID1}$, $V_{SIG}=2V_{SIG2}+V_{SIG1}$.

TABLE 5

STATE SELECTION CIRCUIT DECISION TABLE

| PWM | $I_{dir}$ | $S_{MID}$ | state |
|---|---|---|---|
| 0 | 1 | 0 | S7 |
| 1 | 1 | 0 | S3 |
| 2 | 1 | 0 | S1 |
| 3 | 1 | 0 | S0 |
| 0 | 1 | 1 | S7 |
| 1 | 1 | 1 | S6 |
| 2 | 1 | 1 | S2 |
| 3 | 1 | 1 | S0 |
| 0 | 1 | 2 | S7 |
| 1 | 1 | 2 | S5 |
| 2 | 1 | 2 | S4 |
| 3 | 1 | 2 | S0 |
| 0 | 1 | 3 | S7 |
| 1 | 1 | 3 | S6 |
| 2 | 1 | 3 | S4 |
| 3 | 1 | 3 | S0 |
| 0 | 0 | 0 | S7 |
| 1 | 0 | 0 | S6 |
| 2 | 0 | 0 | S4 |
| 3 | 0 | 0 | S0 |
| 0 | 0 | 1 | S7 |
| 1 | 0 | 1 | S5 |
| 2 | 0 | 1 | S4 |
| 3 | 0 | 1 | S0 |
| 0 | 0 | 2 | S7 |
| 1 | 0 | 2 | S6 |
| 2 | 0 | 2 | S2 |
| 3 | 0 | 2 | S0 |
| 0 | 0 | 3 | S7 |
| 1 | 0 | 3 | S3 |
| 2 | 0 | 3 | S1 |
| 3 | 0 | 3 | S0 |

Figure 14:
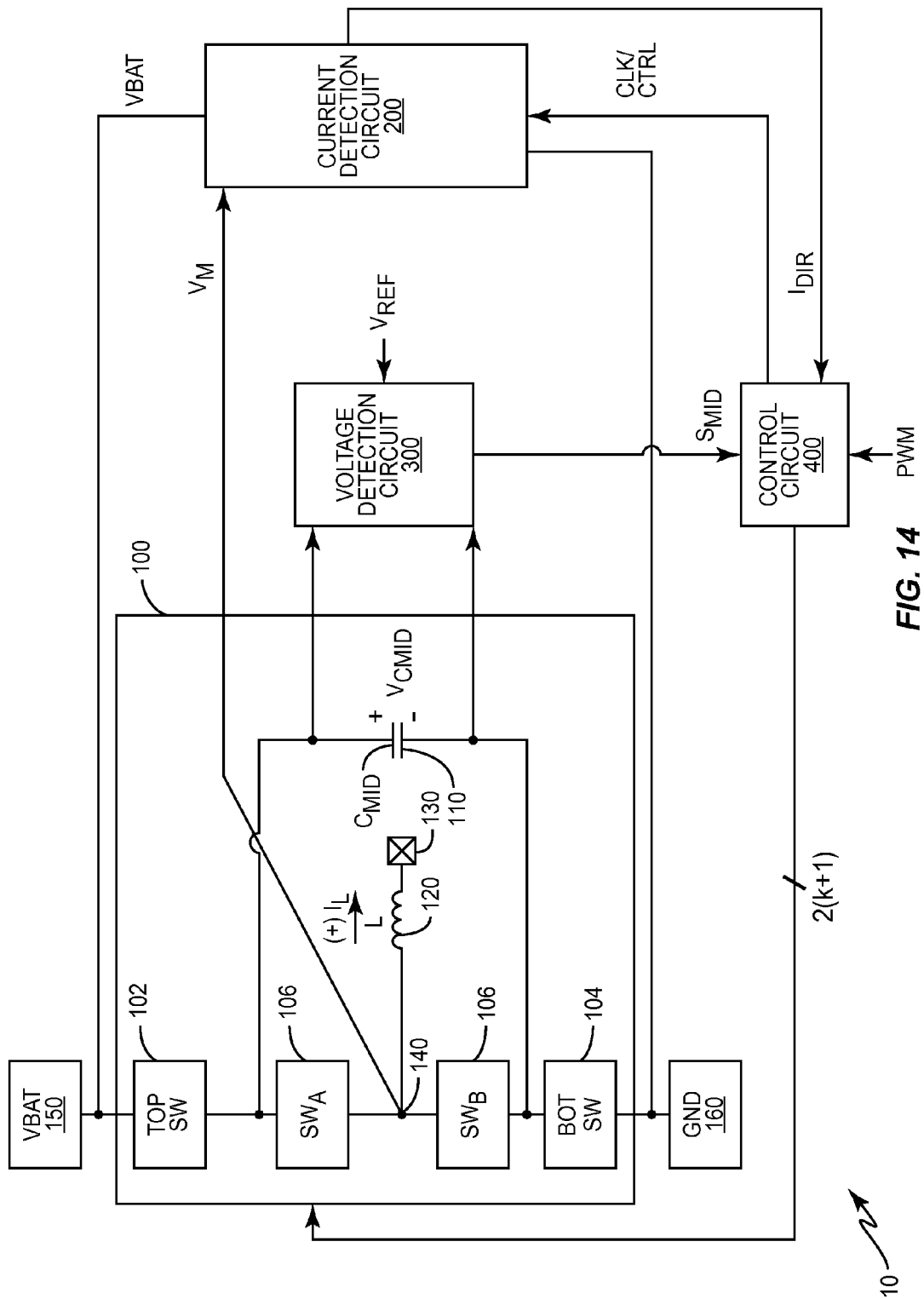
FIG. 14 shows a block diagram of a power conversion circuit according to another exemplary embodiment
Figure 15:
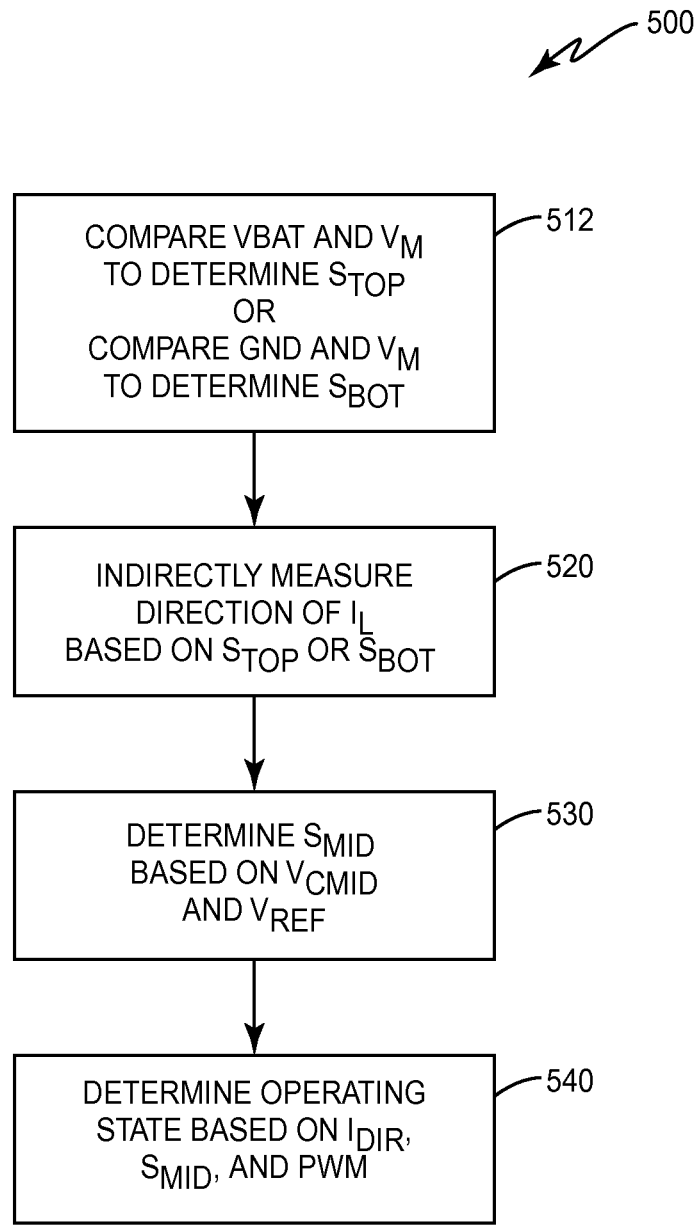
FIG. 15 shows a power conversion method according to another exemplary embodiment.

In addition, embodiments having a single flying capacitor 110 may alternatively be implemented as shown in FIGS. 14 and 15. In this embodiment, the current detection circuit 200 uses the voltage $V_M$ at the midpoint node 140 to indirectly measure the polarity of the current of the inductor 120. While FIG. 14 shows first and second voltages equivalent to VBAT and ground, the first and second voltages may comprise any predetermined voltage levels, where the first voltage 150 exceeds the second voltage 160. The four power switches 102, 104, 106 may be grouped in pairs, where the top switch 102 and bottom switch 104 form one pair, and the two middle switches 106 form a second pair in the example of FIG. 14. As previously discussed, only one power switch in each pair is active at any given time.

FIG. 15 shows an exemplary method 500 of regulating the multilevel power converter 100 of FIG. 14. The method in FIG. 15 is similar to that of FIG. 5, where equivalent steps use the same reference numbers. It will be appreciated that the order of the steps presented in FIG. 15 is exemplary and should not be considered as limiting. Current detection circuit 200 indirectly measures a direction of the current $I_{dir}$ in the inductor L 120 based on VBAT 150, ground 160, and the voltage at the midpoint node $V_M$. As shown in FIG. 14, the positive direction of the inductor current may be interpreted as flowing from the midpoint node 140 to the output node 130. The current detection circuit 200 compares the first voltage 150, e.g., VBAT, to the voltage $V_M$ at the midpoint node 140 to generate a top signal $S_{TOP}$, or compares the second voltage 160, e.g., ground, to $V_M$ to generate a bottom signal $S_{BOT}$ (block 512). Based on $S_{TOP}$ or $S_{BOT}$, the current detection circuit indirectly measures the direction of the inductor current (block 520) and outputs a logic value $I_{dir}$. The capacitor voltage detection circuit 300 detects a voltage $V_{MID}$ across $C_{MID}$ 110, and generates a logic signal $S_{MID}$ based on a comparison between $V_{MID}$ and a reference voltage $V_{REF}$ (block 530). Based on $I_{dir}$, $S_{MID}$, and an input command signal PWM, the control circuit 400 selects an operating state of the multilevel power converter 100, e.g., one of the states in Table 1, to regulate the voltage across the $C_{MID}$ 110 and to generate a target voltage at the midpoint node 140 (block 540).

By using small, high speed analog and digital circuits, the power conversion circuit 10 disclosed herein provides a faster, lower cost solution suitable for mobile communication devices without sacrificing performance.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A power conversion circuit comprising:
a multilevel power converter comprising a first capacitor connected in parallel with a plurality of power switches serially connected between a top power switch and a bottom power switch, and an inductor connected between an output node and a midpoint node connected at a midpoint of the plurality of power switches, the multilevel power converter having three or more levels;
a current detection circuit configured to indirectly measure a direction of a current through the inductor based on one of a comparison between a first voltage and a top voltage associated with the top power switch and a comparison between a second voltage and a bottom voltage associated with the bottom power switch;
a first capacitor voltage detection circuit connected in parallel with the first capacitor and configured to detect a first capacitor voltage across the first capacitor and to generate a first logic signal based on a comparison between the first capacitor voltage and a first reference voltage; and
a control circuit connected to an input of each of the power switches, the control circuit configured to select an operating state of the multilevel power converter to regulate the first capacitor voltage across the first capacitor and to generate a target voltage level at the midpoint node based on the indirectly measured direction of the inductor current, the first logic signal, and an input command signal.

2. The power conversion circuit of claim 1 wherein the current detection circuit comprises:
a top comparator connected in parallel with the top power switch and configured to generate a top signal indicative of the direction of the inductor current based on the comparison between the first voltage and the top voltage associated with the top power switch;
a bottom comparator connected in parallel with the bottom power switch and configured to generate a bottom signal indicative of the direction of the inductor current based on the comparison between the second voltage and the bottom voltage associated with the bottom power switch; and
a processing circuit configured to generate a control signal indicative of the direction of the inductor current based on one of the top and bottom signals.

3. The power conversion circuit of claim 2 wherein one or more of the power switches connected between the midpoint node and the first voltage are active, and wherein a difference between the first voltage and the top voltage comprises a voltage generated by the inductor current as it passes through the one or more active power switches between the midpoint node and the first voltage.

4. The power conversion circuit of claim 2 wherein one or more of the power switches connected between the midpoint node and the second voltage are active, and wherein the a difference between the second voltage and the bottom voltage comprises a voltage generated by the inductor current as it passes through the one or more active power switches between the midpoint node and the second voltage.

5. The power conversion circuit of claim 1 wherein the multilevel power converter comprises a flying capacitor power converter, and wherein the first capacitor is a flying capacitor.

6. The power conversion circuit of claim 1 wherein:
the multilevel power converter further comprises a second capacitor connected in parallel with a subset of the plurality of power switches;
the power conversion circuit further comprises a second capacitor voltage detection circuit connected in parallel with the second capacitor and configured to detect a second capacitor voltage across the second capacitor and to generate a second logic signal based on the second capacitor voltage and a second reference voltage; and
the control circuit selects the operating state of the multilevel power converter based on the indirectly measured direction of the inductor current, the first and second logic signals, and the input command signal.

7. The power conversion circuit of claim 1 wherein:
the multilevel power converter comprises k capacitors including the first capacitor;
the top power switch, the bottom power switch, and the plurality of switches total to 2(k+1) power switches;
k+1 of the power switches including the top power switch are serially connected between the first voltage and the midpoint node;
k+1 of the power switches including the bottom power switch are serially connected between the midpoint node and the second voltage;
a maximum number of levels possible for the multilevel power converter is $N=2^{k+1}$;
the power conversion circuit comprises the first capacitor voltage detection circuit and k−1 additional capacitor voltage detection circuits, each connected in parallel with the corresponding capacitor and configured to detect a capacitor voltage across the corresponding capacitor and to generate a corresponding logic signal based on the corresponding detected capacitor voltage and a corresponding reference voltage; and
the control circuit selects the operating state of the multilevel power converter based on the indirectly measured direction of the inductor current, the logic signals, and the input command signal.

8. The power conversion circuit of claim 1 wherein the first reference voltage is half the first voltage.

9. A method of regulating a multilevel power converter comprising a first capacitor connected in parallel with a plurality of power switches serially connected between a top power switch and a bottom power switch, and an inductor connected between an output node and a midpoint node connected at a midpoint of the plurality of power switches, the multilevel power converter having a number of levels greater than or equal to three, the method comprising:
performing one of a first comparison and a second comparison, said first comparison comparing a first voltage and a top voltage associated with the top power switch, and said second comparison comparing a second voltage and a bottom voltage associated with the bottom power switch;
indirectly measuring a direction of a current through the inductor based on one of the first and second comparisons; and
detecting a first capacitor voltage across the first capacitor;
generating a first logic signal based on a comparison between the first capacitor voltage and a first reference voltage; and
selecting an operating state of the multilevel power converter to regulate the first capacitor voltage across the first capacitor and to generate a target voltage level at the midpoint node based on the indirectly measured direction of the inductor current, the first logic signal, and an input command signal.

10. The method of claim 9 wherein indirectly measuring the direction of the inductor current comprises:

generating one of a top signal indicative of the direction of the inductor current based on the comparison between the first voltage and the top voltage associated with the top power switch and a bottom signal indicative of the direction of the inductor current based on the comparison between the second voltage and the bottom voltage associated with the bottom power switch; and indirectly measuring the direction of the inductor current based on one of the top and bottom signals.

11. The method of claim 10 wherein one or more of the power switches connected between the midpoint node and the first voltage are active, and wherein a difference between the first voltage and the top voltage comprises a voltage generated by the inductor current as it passes through the one or more active power switches between the midpoint node and the first voltage.

12. The method of claim 10 wherein one or more of the power switches connected between the midpoint node and the second voltage are active, and wherein the difference between the second voltage and the bottom voltage comprises a voltage generated by the inductor current as it passes through the one or more active power switches between the midpoint node and the second voltage.

13. The method of claim 9 wherein:
the multilevel power converter further comprises a second capacitor connected in parallel with a subset of the plurality of power switches;
the method further comprises detecting a second capacitor voltage across the second capacitor and generating a second logic signal based on the second capacitor voltage and a second reference voltage; and
selecting the operating state of the multilevel power converter comprises selecting the operating state of the multilevel power converter based on the indirectly measured direction of the inductor current, the first and second logic signals, and the input command signal.

14. The method of claim 9 wherein:
the multilevel power converter comprises the first capacitor and k−1 additional capacitors, each additional capacitor connected in parallel with a different subset of the plurality of power switches;
the top power switch, the bottom power switch, and the plurality of switches total to 2(k+1) power switches;
k+1 of the power switches including the top power switch are serially connected between the first voltage and the midpoint node;
k+1 of the power switches including the bottom power switch are serially connected between the midpoint node and the second voltage;
a maximum number of levels possible for the multilevel power converter is $N=2^{k+1}$;
the method further comprises detecting a capacitor voltage across a corresponding one of the additional capacitors and generating a corresponding logic signal based on the corresponding detected capacitor voltage and a corresponding reference voltage; and
select the operating state of the multilevel power converter comprises selecting the operating state of the multilevel power converter based on the indirectly measured direction of the inductor current, the logic signals, and the input command signal.

15. The method of claim 9 wherein the first reference voltage is half the first voltage.

16. A power conversion circuit comprising:
a multilevel power converter comprising a first capacitor connected in parallel with a plurality of power switches serially connected between a top power switch and a bottom power switch, and an inductor connected between an output node and a midpoint node connected at a midpoint of the plurality of power switches, the multilevel power converter having three or more levels;

a current detection circuit configured to indirectly measure a direction of a current through an inductor connected between the midpoint node and the output node based on one of a comparison between a battery voltage and a top voltage associated with the top power switch and a comparison between a ground voltage and a bottom voltage associated with the bottom power switch;

a first capacitor voltage detection circuit connected in parallel with the first capacitor and configured to detect a first capacitor voltage across the first capacitor and to generate a first logic signal based on a comparison between the first capacitor voltage and a first reference voltage; and a control circuit connected to an input of each of the power switches, the control circuit configured to control the power switches based on the indirectly measured direction of the inductor current, the first logic signal, and an input command signal to regulate a first capacitor voltage across the first capacitor and to generate a target voltage level at the midpoint node.

17. A power conversion circuit comprising:
a multilevel power converter comprising a capacitor connected in parallel with two middle power switches serially connected between a top power switch and a bottom power switch, and an inductor connected between an output node and a midpoint node connected at a midpoint between the two middle power switches;

a current detection circuit configured to indirectly measure a direction of a current through the inductor based on one of a comparison between a first voltage and a midpoint voltage associated with the midpoint node and a comparison between a second voltage and the midpoint voltage;

a capacitor voltage detection circuit connected in parallel with the capacitor and configured to detect a capacitor voltage across the capacitor and to generate a logic signal based on a comparison between the capacitor voltage and a reference voltage; and a control circuit connected to an input of each of the power switches, the control circuit configured to select an operating state of the multilevel power converter to regulate the capacitor voltage across the capacitor and to generate a target midpoint voltage at the midpoint node based on the indirectly measured direction of the inductor current, the logic signal, and an input command signal.

18. A method of regulating a multilevel power converter comprising a capacitor connected in parallel with two middle power switches serially connected between a top power switch and a bottom power switch, and an inductor connected between an output node and a midpoint node connected at a midpoint of the middle power switches, the method comprising:

performing one of a first comparison and a second comparison, said first comparison comparing a first voltage and a midpoint voltage associated with the midpoint node, and said second comparison comparing a second voltage and the midpoint voltage;

indirectly measuring a direction of a current through the inductor based on one of the first and second comparisons; and detecting a capacitor voltage across the capacitor;
generating a logic signal based on a comparison between the capacitor voltage and a reference voltage; and selecting an operating state of the multilevel power converter to regulate the capacitor voltage across the capacitor and to generate a target midpoint voltage at the midpoint node based on the indirectly measured direction of the inductor current, the logic signal, and an input command signal.

* * * * *